US006335114B1

(12) United States Patent
Ueshima et al.

(10) Patent No.: US 6,335,114 B1
(45) Date of Patent: Jan. 1, 2002

(54) LAMINATE-TYPE BATTERY AND PROCESS FOR ITS MANUFACTURE

(75) Inventors: Hiroshi Ueshima, Anjo; Kenichiro Kami, Takahama; Tadayoshi Amano, Kariya; Norikazu Hosokawa, Nagoya; Ryuichirou Shinkai, Anjo; Manabu Yamada, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/440,512

(22) Filed: Nov. 15, 1999

(30) Foreign Application Priority Data

Nov. 16, 1998 (JP) .......................... 10-325482
Jul. 22, 1999 (JP) .......................... 11-208264
Oct. 5, 1999 (JP) .......................... 11-284882

(51) Int. Cl.[7] .......................... H01M 10/00; H01M 4/70
(52) U.S. Cl. .................. 429/94; 429/161; 429/162; 429/211; 429/217; 429/245
(58) Field of Search .................. 429/94, 211, 161, 429/162, 217, 245, 233

(56) References Cited

U.S. PATENT DOCUMENTS 3,761,314 A * 9/1973 Cailley
4,767,682 A * 8/1988 Dorogi et al.
5,736,270 A * 4/1998 Suzuki et al.

FOREIGN PATENT DOCUMENTS

| JP | 55-80269 | 6/1980 |
|---|---|---|
| JP | 4-342966 | 11/1992 |
| JP | 6-290771 | 10/1994 |
| JP | 7-296847 | 11/1995 |
| JP | 9-223501 | 8/1997 |
| JP | 10-6453 | 1/1998 |
| JP | 10-55794 | 2/1998 |
| JP | 10-106545 | 4/1998 |
| JP | 10-106546 | 4/1998 |

* cited by examiner

Primary Examiner—John S. Maples
(74) Attorney, Agent, or Firm—Pillsbury Winthrop LLP

(57) ABSTRACT

There are provided coiled electrode batteries with high yields, while short-circuiting in the batteries is prevented. A coiled electrode battery according to the invention has coiled electrodes consisting of positive and negative poles 21, 22 and two separators 23 lying between them. In the coiled electrodes, insulating layers 216, 226 made of insulating resin are formed on both sides of the proximal sections of the protrusions 213, 223 of the positive and negative poles 21, 22. Thus, even if the non-protruding sections of the positive and negative electrodes 21, 22 become exposed due to winding misalignment of the separators 23 in the lengthwise direction, the presence of the insulating layers 216, 226 prevents short-circuits between the proximal sections of the protrusions 213, 223 of the positive and negative electrodes 21, 22. As a result, yields are increased as short-circuits are avoided inside the battery.

14 Claims, 19 Drawing Sheets

100nm

10μm

100nm

100nm

LAMINATE-TYPE BATTERY AND PROCESS FOR ITS MANUFACTURE

BACKGROUND OF THE INVENTION

1. Field of the Invention

The present invention relates to the technical field of laminate-type batteries such as coiled electrode batteries, and of manufacturing processes for electrodes that can be employed in such laminate-type batteries.

2. Description of the Prior Art

As lithium ion secondary batteries with high energy density per unit volume and per unit weight have become commonly used as power sources for cellular telephones, portable video cameras, portable data terminals and the like, attention is also being focused on their use as batteries for electric automobiles.

When lithium ion secondary batteries are used for electric automobiles, however, the requirement to provide high power has presented problems of heat generation and insufficient output because of the high internal resistance of the batteries in the commonly employed system of current output through tabs. That is, it has been difficult and thus inconvenient to achieve high output by current collection from coiled electrodes with simple tabs. However, when it is attempted to weld multiple tabs to coiled electrodes, the multiple tabs become welded to the coiled electrodes during coiling, resulting in the inconvenience of low productivity as the number of steps in the coiling process is increased.

With the aim of eliminating this inconvenience, Japanese Unexamined Patent Publication No. 55-80269 has disclosed a coiled electrode battery which is based on the prior art.

This coiled electrode battery has a coiled formed by electrode coiling both a belt-like positive plate and negative plate having protrusions protruding out along the axial length of the coil in opposite directions to each other, and a separator lying between the positive plate and negative plate. That is, both the positive plate and negative plate have a protrusion protruding out from the edges of each electrode plate of with opposite polarity (opposite polarity plates). The positive plate and negative plate have respective collectors welded thereto, and the positive plate and negative plate are connected through these collectors to a pair of positive/negative electrode terminals that supply external power.

Thus, the coiled electrode batteries of the prior art require no connection of multiple tabs and can therefore be produced without sacrificing productivity, while their collectors with low electrical resistance allow them to exhibit large output without the risk of overheating.

Nevertheless, with the aforementioned coiled electrode battery of the prior art, it has been difficult to achieve production at high yields because the protrusions contact with the edges of the opposite polarity plates due to misaligned winding of the separator, producing short-circuits. For example, if the positions of the positive plate, negative plate and separator do not precisely match in the axial length direction of the coil, the opposite edge which is in the opposite direction from the protrusions will contact the adjacent protrusions of opposite polarity, causing a short-circuit. Since short-circuits can be easily caused by contact between the opposite edge of the negative plate and the protrusion of the positive plate when the separator is misaligned, the defect rate has often been significantly high in the production process.

This sort of problem is not limited to coiled electrode batteries but can also occur with other laminate-type batteries of the prior art, for example, batteries equipped with laminated electrodes prepared by forming disk-shaped positive plates and negative plates laid together with a separator between them, such as coin-type batteries, and batteries equipped with laminated electrodes formed by alternately laminating square-shaped positive plates and negative plates with separators between them, such as square batteries.

That is, even in these laminate-type batteries, if the alignment positions of the positive plate, negative plate and separator do not precisely match, the opposite edge which is in the opposite direction from the protrusion can contact the adjacent protrusion of opposite polarity, causing a short-circuit. As a result, since short-circuiting can easily occur, for example, if the opposite edge of the negative plate exposed by misalignment of the separator contacts with the protrusion of the positive plate, similar to the coiled electrode battery mentioned above, the reject rate has often been significantly high in the production process. Consequently, it cannot be said that laminate-type batteries of the prior art offer sufficiently high product yields.

On the other hand, all batteries of the prior art are susceptible to shrinkage of the separator upon abnormal increase of temperature in the battery during use. The possibility also exists that vibrations, etc. will cause the separator to shift from the prescribed position between the positive plate and negative plate. In these cases as well, the protrusions of the positive plate and negative plate which protrude out beyond the edges of the opposite polarity plates can produce short-circuits by contacting with the edges of the opposite polarity plates.

It is therefore an object of the invention to provide a laminate-type battery that can reliably prevent short-circuiting inside the battery and which allows higher product yields.

It is another object of the invention to provide an electrode-manufacturing process that can be used for such a laminate-type battery and that allows easy manufacture of electrodes.

SUMMARY OF THE INVENTION

The present inventors have invented the following means in order to achieve these objects.

(First aspect)

The first aspect of the invention is a laminate-type battery with a laminated electrode prepared by laminating a sheet-like positive plate and negative plate and a separator lying between the positive plate and the negative plate, characterized in that at least either one of the positive plate and the negative plate has a protrusion that protrudes out beyond the edge of the other electrode plate of opposite polarity (opposite polarity plate), and the protrusion has a short-circuit preventing layer on the surface of at least its proximal section. The protrusion may be a conductor formed separately from the electrode and bonded to the electrode plate, or it may be formed integrally with the electrode. It is particularly preferred for the protrusion to protrude from the edge of the opposite polarity plate which is adjacent to it via the separator.

According to this aspect, the laminate-type battery which allows contact between the electrode plate with the protrusion and the non-protruding edge (non-protruding section) of the opposite polarity plate, is provided with a short-circuit preventing layer at the proximal section of the protrusion. Consequently, even if the non-protruding section contacts with the proximal section of the protrusion due to lamination misalignment of the separator when the positive plate and negative plate are laminated, the presence of the short-circuit preventing layer lying between the non-protruding section and the proximal section of the protrusion prevents short-circuiting between the positive and negative poles. In addition, when there is a risk of the non-protruding section contacting with the protrusion due to burrs on the non-protruding section, short-circuiting between the positive and negative poles is prevented in the same manner by the short-circuit preventing layer situated at the proximal section of the protrusion.

According to this aspect, therefore, short-circuiting between the positive and negative poles in the battery can be reliably prevented for an effect which allows laminate-type batteries to be provided at higher product yields.

With this aspect, the external leads of the device to which the power from the battery is to be supplied can be directly connected to the positive plate and negative plate of the laminate-type battery, but for the purpose of increasing the power current-collecting efficiency and sealing of the electrolyte solution, it is preferred to provide a pair of positive and negative electrode terminals which are connected to the positive plate and negative plate, respectively, and supply power externally. In this case, it is preferred for at least either one of the positive plate and negative plate to have protrusions that protrude out beyond the edge of the opposite polarity plate and are connected to the electrode terminal, and for each protrusion to have a short-circuit preventing layer on the surface of its proximal section.

In a laminate-type battery where such protrusions are connected to the electrode terminals it is not possible for the edge of the separators to protrude out beyond the protrusions. In a battery where the protrusions must necessarily protrude beyond the edge of the separators, such as a laminate-type battery in which the protrusions are connected to the electrode terminals in this manner, slight lamination misalignment of the separator may create contact between the protrusion and the edge of the opposite polarity plate from the electrode plate with the protrusion. It is highly expensive to prevent such slight laminate misalignment of the separator.

This aspect is particularly effective for batteries wherein the protrusion protrudes out not only beyond the edge of the opposite polarity plate but also beyond the edge of the separator lying between the electrode plate with the protrusion and the opposite polarity plate. In other words, the above-mentioned short-circuit preventing layer can reliably prevent short-circuits between the positive and negative poles even when the separator experiences slight lamination misalignment. The short-circuit preventing layer can be inexpensively and easily situated, compared to efforts to prevent slight lamination misalignment of the separator. The resulting effect can economically provide laminate-type batteries with higher product yields.

Particularly when the protrusions are connected to the electrode terminals, the protrusions of the electrode plates sometimes bend in the direction of the electrode terminals, thus deforming the protrusions. When this occurs, the deformed protrusions can easily contact with the edge of the opposite polarity plate, and slight lamination misalignment of the separator can risk creating contact between the protrusions and the edges of the opposite polarity plates. It is highly expensive to prevent such slight lamination misalignment of the separator. According to this aspect, the short-circuit preventing layer described above can reliably and inexpensively prevent short-circuits between the positive and negative poles even when the protrusions contact the electrode terminals in this manner, and the resulting effect can economically provide laminate-type batteries with higher product yields.

This aspect can be applied to laminate-type batteries having publicly known laminated structures, such as batteries equipped with laminated electrodes prepared by forming disk-shaped positive plates and negative plates laid together with a separator between them, such as coin-type batteries, and batteries equipped with laminated electrodes formed by alternately laminating square-shaped positive plates and negative plates with separators between them, such as square batteries. There is also no particular limitation to these types of batteries, and it may be applied to publicly known types of laminate-type batteries such as lithium batteries. It can also be applied to both primary batteries and secondary batteries.

For example, when this aspect is applied to a lithium secondary battery, the following materials may be used for the positive plate, negative plate, separator and electrolyte solution.

A publicly known positive electrode active material may be used as the active material for the positive plate. Among them it is preferred to use complex compounds of lithium with transition metals, such as lithium manganate ($LiMn_2O_4$), lithium cobaltate, lithium nickelate, etc. These complex compounds exhibit excellent discharge properties of lithium ions during charge (deintercalation performance) and occlusion properties of lithium ions during discharge (intercalation performance), and are therefore excellent for the charge/discharge reaction of the positive plate.

A publicly known carbon material can be used as the active material for the negative plate. Preferred for use are those comprising highly crystalline natural graphite and artificial graphite. Such highly crystalline carbon materials exhibit excellent intercalation performance of lithium ions during charge and deintercalation performance of lithium ions during discharge, and are therefore excellent for the charge/discharge reaction of the negative plate. Oxides and sulfides can also be used as active materials in addition to carbon materials.

Both the positive plate and negative plate are preferably electrode plates having a layer containing an electrode active material formed on a collector plate with excellent electric conductivity. In such cases, the protrusion may be formed integrally with the collector plate.

The separator used may also be made of a publicly known material, and for example, separators comprising polyolefin-based polymers such as polyethylene and polypropylene may be used.

The electrolyte solution used may be a publicly known one. Particularly preferred for use are non-aqueous electrolyte solutions prepared by dissolving lithium salts such as $LiPF_6$ in organic solvents such as ethylene carbonate.

(Second aspect)

The second aspect of the invention is characterized by being similar to the first aspect but having a coiled electrode construction wherein the positive plate, negative plate and separator are coiled while laminated together, and the protrusion protrudes out in the coiled axial length direction.

Since a laminated electrode that is a coiled electrode experiences a dynamic state wherein the coiled electrode rotates while it is wound up during formation, it is prone to winding misalignment of the separator. Once a winding misalignment of the separator occurs, however slight, during formation of the coiled electrode, the winding misalignment will often become larger as coiling continues. Rectification of winding misalignments of the separator during coiling is not only difficult, but when the winding separator is forced in the opposite direction of the winding misalignment to prevent the winding misalignment from increasing, abnormal stress is generated not only on the separator but also on the electrode plates, which can result in failure to form a coiled electrode of satisfactory quality.

According to this aspect, the presence of the short-circuit preventing layer lying between the non-protruding section and the proximal section of the protrusion reliably prevents short-circuiting between the positive and negative poles even when winding misalignment of the separator occurs. It is therefore possible to easily obtain coiled electrodes with satisfactory quality guaranteed even when separator misalignments occur.

According to this aspect as well, as described for the first aspect, it is preferred to provide a pair of positive and negative electrode terminals which supply power externally, and at least a part of the coil axis core (core rod) may serve as the electrode terminal. In this case, the protrusion may be connected to the electrode terminal and it is preferred for the protrusion to have the short-circuit preventing layer situated on at least the proximal section on the inner surface, of the inner and outer surfaces.

According to this aspect, the short-circuit preventing layer is situated at the proximal section of at least the inner surface, of both surfaces of the protrusion with which the non-protruding section can contact. Thus, when the protrusions are bent in the centripetal direction and connected to the electrode terminals, the presence of the short-circuit preventing layer lying between the non-protruding section and the proximal section of the protrusion prevents short-circuiting between the positive and negative plates even when the non-protruding section contacts with the inner surface of the proximal section of the protrusion. In addition, when there is a risk of the non-protruding section contacting with the outer surface of the protrusion due to burrs on the non-protruding section, short-circuiting between the positive and negative poles is prevented in the same manner by the short-circuit preventing layer situated at the proximal section of both surfaces of the protrusion. Thus, short-circuiting does not occur between the positive and negative poles even when misalignment of the separator occurs in the direction of the coiled axis length.

According to this aspect, therefore, short-circuiting between the positive and negative poles in the battery can be reliably prevented for an effect which allows coiled electrode batteries to be provided at higher product yields.

(Third aspect)

The third aspect of the invention is characterized in that in either the first aspect or the second aspect mentioned above, the short-circuit preventing layer is made of an insulator. That is, the short-circuit preventing layer is an insulating layer formed on the surface of the proximal section of the protrusion. The insulating layer can be formed by coating the surface of the proximal section of the protrusion with a resin that is insoluble in the electrolyte solution by a hot-melt method or solvent cast method, attaching tape made of an insulating material, or forming an electrically insulating oxide film. Formation of the short-circuit preventing layer with an insulating layer can more reliably prevent short-circuits.

According to this aspect, therefore, the effects of the first and second aspects can be further reinforced.

(Fourth aspect)

The fourth aspect of the invention is characterized in that in any one of the aforementioned first to third aspects, the short-circuit preventing layer is formed on the edge of the separator protruding up to the proximal section of the protrusion. Thus, since there are no additional constituent elements of the laminated electrode with respect to the first to third aspects, it is possible to manufacture a laminate-type battery more economically while preventing short-circuits between the positive and negative poles in the battery. This is particularly effective for coiled electrode batteries. That is, since there are no additional constituent elements for the coiled electrodes, coiled electrode batteries can be manufactured more economically while preventing short-circuits between the positive and negative poles in the battery.

According to this aspect, therefore, an effect is provided whereby coiled electrode batteries can be manufactured relatively inexpensively, in addition to the effects of the first to third aspects.

(Fifth aspect)

The fifth aspect of the invention is characterized in that in the aforementioned fourth aspect, the other electrode plate, as a second electrode plate adjacent to the one end of the electrode plates, as a first electrode plate, has a protrusion that protrudes out beyond the non-protruding edge of the first electrode plate, the separator has a shape which covers both sides of the first electrode plate and the non-protruding edge of the first electrode plate, and the section of the separator which covers the non-protruding edge isolates the non-protruding edge from the proximal section of the protrusion of the second electrode plate adjacent to the non-protruding edge.

According to this aspect, not only does the separator protrude up to the proximal section of the protrusion of the other electrode plate, but it has a shape with covers both sides and the non-protruding section of the first electrode plate. Consequently, because of the construction of the separator which covers both sides of one pole, it is sufficient to simply laminate the first electrode plate covered with the separator on both sides and the other electrode plate instead of providing two separators between the positive and negative poles, and the lamination step is therefore simplified. This is particularly effective for coiled electrode batteries. That is, since it is sufficient to simply coil the first electrode plate covered with the separator on both sides and the other electrode plate during the coiling step for the electrode plates, the lamination step is therefore simplified.

According to this aspect, in addition to the construction where the edge of the separator protrudes up to the proximal section of the protrusion of the first electrode plate to form the short-circuit preventing layer, the separator is also constructed so as to cover the non-protruding section of the first electrode plate, such that the section of the separator covering the non-protruding section isolates the non-protruding section from the proximal section of the protrusion of the other electrode plate adjacent to the non-protruding section, and therefore insulation can be more reliably achieved between the non-protruding section of the first electrode plate and the proximal section of the protrusion of the other electrode plate. This is also particularly effective for coiled electrode batteries.

According to this aspect, therefore, an effect is provided whereby the number of lamination steps is reduced and the insulation properties can be more reliably guaranteed, in addition to the effect of the fourth aspect.

(Sixth aspect)

The sixth aspect of the invention is characterized in that, in any one of the aforementioned first to fifth aspects, the separator is a porous film formed integrally with the surface of either or both of the protrusion-provided electrode plates of the positive plate and negative plate. The porous film is a film with large pores that allows electrolytes (electrolyte ions) to pass through.

According to this aspect, the porous film can fulfill the role of the separator. Here, it is less expensive to form a separator comprising a porous film integrated with the surface of the electrode plate, than to fabricate a normal film separator to form the laminated electrode. In addition, since it is not necessary to interlay two film separators between the positive plate and negative plate in the lamination step for the electrode plates, it is possible to further simplify the lamination steps and reduce the number of lamination steps. Furthermore, because it is sufficient to achieve a perfectly matched combination between only the positive plate and negative plate, reduced yields due to lamination misalignment of the separator can be avoided. Laminate-type batteries can therefore be manufactured with excellent productivity.

This is particularly effective for coiled electrode batteries. That is, it is less expensive to form a separator comprising a porous film integrated with the surface of the electrode plate, than to fabricate a normal film separator to assemble the laminated electrode. In addition, since it is not necessary to coil up two film separators between the positive plate and negative plate in the coiling step for the coiled electrode, it is possible to further simplify the coiling steps and reduce the number of coiling steps. Furthermore, reduced yields due to coil shifting of the separator can be avoided. As a result, coiled electrode batteries can be manufactured with excellent productivity.

According to this aspect, therefore, an effect is provided whereby laminate-type batteries can be manufactured much more inexpensively, in addition to the effects of the first to fifth aspects.

With this aspect, the porous film may be formed on the surface of both electrode plates or the porous film may be formed only on the surface of one electrode plate, when both the positive plate and negative plate have protrusions.

Incidentally, the porous film according to this aspect is preferably formed from thermoplastic polymers which are crystalline thermoplastic polymers with a melting point of 150° C. or above and/or amorphous thermoplastic polymers with a glass transition point of 150° C. or above. Such a porous film made of a thermoplastic polymer with a melting point or glass transition point of 150° C. or above is resistant to deformation such as thermal contraction and melting, oxidative destruction, etc. up to high temperatures, particularly its melting point or glass transition point of 150° C. or above. In other words, the porous film has superior heat resistance against high temperatures.

Since thermoplastic polymers have excellent plasticity at high temperatures, the separator can easily close pores when heated to high temperatures, particularly 150° C. or above. The battery can therefore effectively exhibit a shutdown function with a temperature increase.

Thus, by using an electrode plate with this type of porous film integrally formed therein, even when the internal battery temperature reaches high temperatures exceeding 150° C. it is possible to avoid melting and deformation such as heat contraction so that short-circuits between the positive pole and negative pole are avoided and heat generation by oxidative destruction may be avoided, so that an effect of further enhanced safety is provided for the battery.

(Seventh aspect)

The seventh aspect of the invention is characterized in that in the aforementioned sixth aspect, the porous film contains at least one type from among polypropylene, polybenzimidazole, polyimide, polyether imide, polyamidoimide, polyphenylene ether (polyphenylene oxide), polyallylate, polyacetal, polyamide, polyphenylene sulfide, polyethersulfone, polysulfone, polyether ketone, polyester resins, polyethylene naphthalate, ethylene-cycloolefin copolymers, polyvinylidene fluoride and vinylidene fluoride-hexafluoropropylene-tetrafluoroethylene copolymer.

These heat resistant polymers are polymers with particularly high melting points or glass transition points even among heat resistant polymers with melting points or glass transition points of 150° C. or above. Thus, by using an electrode plate with this type of porous film integrally formed therewith, it is possible to further enhance the safety of the battery without producing short-circuits even when the internal battery temperature exceeds 150° C. These heat resistant polymers are also relatively easy to obtain and inexpensive. Consequently, this aspect allows easy and economical formation of porous films with very excellent heat resistance. In other words, electrode plates with such porous films integrally formed therewith can be easily and economically manufactured.

According to this aspect, therefore, an effect is provided whereby a battery with guaranteed safety can be obtained, in addition to the effects of the sixth aspect.

(Eighth aspect)

The eighth aspect of the invention is characterized in that in the aforementioned seventh aspect, the polyester resin is either or both polybutylene terephthalate and polyethylene terephthalate.

According to this aspect, fine pores are uniformly formed in the porous film so that the electrolytes easily pass through the porous film and the resistance of the porous film is lowered. As a result, the high current properties, etc. of the battery are enhanced.

(Ninth aspect)

The ninth aspect of the invention is characterized in that in any one of the aforementioned sixth to eight aspects, the porous film is provided with, in the direction of its thickness, a sponge-like interior and a surface having densely formed pores of a smaller size than in the interior. Since the interior is sponge-like in this porous film, it has large-sized pores and also a high porosity. The electrolytes can therefore move very easily and the permeability is thus very excellent.

On the other hand, the surface with densely formed pores of a smaller size than the interior can very effectively prevent deposition of dendrites in the negative plate. Because of the small size of the pores, those pores can be rapidly and fully closed under high temperature. The shutdown function can thus be even more effectively exhibited when the battery is at high temperatures. Also, since the surface has high density and strength, the mechanical strength of the porous film can be increased.

The porous film as described above has very excellent electrolyte permeability and can effectively exhibit a shutdown function even at high temperature. By using an electrode plate with a porous film of this type integrally formed therewith it is thus possible to further enhance the battery properties such as the load characteristics and output characteristics of the battery, while also more effectively preventing shorts and abnormal heat generation.

According to this aspect, therefore, an effect is provided whereby superior battery performance can be achieved and the safety of the battery can be enhanced, in addition to the effects of the sixth to eighth aspects.

(Tenth aspect)

The tenth aspect of the invention is characterized in that in any one of the aforementioned first to ninth aspects, either or both the positive plate and the negative plate consist of at least an active material and a binder, and the binder comprises a hydrophilic polymer material with hydrophilic groups which is crosslinked together via a crosslinking agent which undergoes a binding reaction with the hydrophilic groups.

According to this aspect, the binder which binds the active material comprises a hydrophilic polymer material which is strongly crosslinked with a crosslinking agent, and it therefore has high chemical stability and does not dissolve or react with the electrolyte solution. The electrolyte active material is therefore stably bound over long periods by the binder, thus allowing a satisfactory battery reaction to be reliably accomplished during that time.

According to this aspect, therefore, an effect is provided whereby superior battery performance can be achieved over long periods, in addition to the effects of the sixth to ninth aspects.

According to this aspect, the active material-containing mixture is prepared by combining the electrode active material, the hydrophilic polymer material with hydrophilic groups, the crosslinking agent with functional groups that can cause a hydrolysis reaction with the hydrophilic groups for binding, and a solvent, and the active material-containing mixture may be used to shape the electrode plate into the desired shape.

(Eleventh aspect)

The eleventh aspect of the invention is a process for manufacture of an electrode having a sheet-like electrode body and a protrusion that protrudes out beyond the edge of the electrode body, having an insulating porous film on the surface of the electrode body and having a short-circuit preventing film formed integrally with the porous film on the surface of at least the proximal section of the protrusion, characterized by comprising an electrode plate-forming step wherein an electrode plate is formed comprising the electrode body and the protrusion, a polymer mixture layer-forming step wherein a polymer mixture prepared by dissolving a polymer material in a good solvent therefor is adhered in the form of a layer onto the surface including the electrode plate and the proximal section of the protrusion, to form a polymer mixture layer on that surface, a polymer deposition step wherein the polymer mixture layer is exposed to a poor solvent for the polymer material to deposit the polymer material, and a drying step wherein the polymer material deposited from the polymer mixture layer is dried to obtain the short-circuit preventing layer and the porous film.

In the polymer mixture layer-forming step, a layer of a finely-dispersed polymer material is formed on the surface of the electrode plate. Since the good solvent and poor solvent for the polymer material in the polymer mixture layer are exchanged in the ongoing polymer deposition step, the solubility of the polymer material in the polymer mixture layer is lowered, resulting in deposition of the polymer material. In the subsequent drying step the solvent in the polymer mixture layer is evaporated to give a porous film with the function of a short-circuit preventing layer and separator.

In the electrode plate-forming step, the protrusion may be simply formed in addition to the electrode body, thus allowing easy and economical formation of an electrode plate with the electrode body and protrusion integrally formed, and avoiding the complex electrode plate-forming means required for publicly known electrode plate-forming methods. Simple apparatuses (equipment) may be used in all of the steps of the polymer mixture layer-forming step, the polymer deposition step and the drying step, thus greatly facilitating the operation. Each of the steps can therefore be carried out easily and economically.

This aspect may be used for any one of the aforementioned sixth to tenth aspects to easily and economically form an electrode provided with the short-circuit preventing layer and the porous film. An electrode manufactured according to this aspect may be used in the manufacture of a laminate-type battery according to any one of the aforementioned sixth to tenth aspects, to allow inexpensive manufacture of the laminate-type battery.

The short-circuit preventing layer and porous film may be formed separately when it is desired to change the materials of the short-circuit preventing layer and the porous film, but they are preferably formed simultaneously when they are to be made of the same material. By simultaneously forming the short-circuit preventing layer and the porous film it is possible to shorten the steps for formation of an electrode with a short-circuit preventing layer and porous film, thus improving the productivity of the electrode. The electrode can therefore be formed even more economically.

The polymer mixture layer-forming step, the polymer deposition step and the drying step according to this aspect may be carried out in the following manner.

[Polymer mixture layer-forming step]

The polymer material used may be a thermoplastic polymer which is selected from either or both crystalline thermoplastic polymers with a melting point of 150° C. or above and/or amorphous thermoplastic polymers with a glass transition point of 150° C. or above. There may be used one or more types from among polypropylene, polybenzimidazole, polyimide, polyether imide, polyamidoimide, polyphenylene ether (polyphenylene oxide), polyallylate, polyacetal, polyamide, polyphenylene sulfide, polyethersulfone, polysulfone, polyether ketone, polyester resins, polyethylene naphthalate, ethylene-cycloolefin copolymers, polyvinylidene fluoride and vinylidene fluoride-hexafluoropropylene-tetrafluoroethylene copolymer. When a polyester resin is used, it is preferably either or both polybutylene terephthalate and polyethylene terephthalate.

There are no particular restrictions on the good solvent for the polymer material used in the polymer mixture layer-forming step, and it may be appropriately selected depending on the polymer material used. However, for most polymer materials including the polymer materials mentioned above, organic solvents may be used as the good solvents.

According to this aspect, particularly suitable good solvents are N-methyl-2-pyrrolidone (NMP), dimethylsulfoxide, dimethylsulfonamide, diglime, toluene, xylene, dimethylacetamide, dichloromethane, cyclohexane and cyclohexanone. These exemplary good solvents easily dissolve polymer materials, and can satisfactorily dissolve the aforementioned polymer materials in particular. Preparation of the polymer mixture is thereby facilitated.

In order to obtain a porous film with a uniform thickness, a surfactant, defoaming agent, surface modifier, etc. may be added to the polymer mixture. Such additives are preferably fluorine-based or silicon-based compounds that have low reactivity in the battery and exhibit an effect even when added in small amounts. The pore shape, size and distribution of the porous film can be appropriately adjusted by adding water, an alcohol, a glycol, a ketone or an alkane such as decane to the polymer solvent.

On the other hand, the conditions such as the concentration and temperature of the good solvent are preferably appropriately selected to allow satisfactory dispersion of the polymer material.

The polymer mixture may be in liquid form or in paste form. The method of adhering the polymer mixture as a layer on the surface of the electrode plate may also be appropriately selected depending on the form of the polymer mixture.

In the case of a paste-like polymer mixture, it may be applied by a coating method using a blade coater, roll coater, knife coater, die coater, comma coater, reverse roll coater or gravure coater, for adhesion of the polymer mixture as a layer onto the surface of the electrode plate. In these coating methods, the polymer solution is preferably a high viscosity solution to prevent the polymer solution from displacing the air in the pores of the electrode plate. For example, when a polyetherimide is used as the polymer material, a high viscosity polymer solution can be obtained by dissolving it in an amount of 10–30 wt % (solid concentration) with respect to the total polymer solution. A thickener or the like may also be added to increase the viscosity of the polymer solution.

In the case of a liquid polymer mixture, the polymer mixture may be sprayed onto the surface of the electrode plate, or the electrode plate may be immersed in the polymer mixture for adhesion. In the latter adhesion method, it is preferred to use a low viscosity polymer solution in order to improve the solution run-off when the electrode plate is pulled out from the polymer solution. For example, when a polyetherimide is used as the polymer material, a low viscosity polymer solution can be obtained by dissolving it in an amount of no greater than 10 wt % with respect to the total polymer solution.

A polymer film prepared by forming the polymer mixture into the form of a film can also be adhered (transferred) onto the surface of the electrode plate.

The thickness of the polymer mixture layer is preferably in the range of 20–100 $\mu$m. If necessary, the density of the polymer mixture layer may be increased to the desired density by a method such as calender rolling, etc.

[Polymer deposition step]

In this step, the electrode plate coated with the polymer solution is immersed in a poor solvent for the polymer material (poorly-dissolving solution), or is exposed to a gas of the solvent in the vapor phase, to expose the polymer material to the poor solvent. For example, when a liquid form of the polymer mixture is used, the polymer mixture exposed to the poor solvent for the polymer material undergoes gelling, and the polymer material is deposited.

There are no particular restrictions on the poor solvent for the polymer material in this step, and it may be appropriately selected depending on the polymer material used and its good solvent. However, since it is preferred to use an organic solvent as the good solvent for most polymer materials including the polymer materials mentioned above, water, an alcohol, a ketone or an alkane such as decane is preferably used as the poor solvent.

In this step, the poor solvent used may be at least one from among water, alcohols and ketones as mentioned above, as well as sulfolane, $\gamma$-butyrolactone, formamide, nitrobenzene, propylene carbonate, ethylene carbonate, tricresyl phosphate and triphenyl phosphate. The poor solvents mentioned here have boiling points of 200° C. and above, which are higher boiling points than the good solvents mentioned above. The phase separation of the polymer material is thus facilitated in the drying step.

On the other hand, the conditions including the concentration and temperature of the poor solvent are preferably selected as appropriate to facilitate exchange with the good solvent and allow satisfactory deposition of the polymer material.

[Drying step]

In this step, the solvent component of the polymer solution may be removed using a thermostatic chamber, a hot air drier, a vacuum drier, etc. Once the solvent component is removed from the polymer solution, the deposited polymer material becomes a porous film.

Incidentally, by appropriate selection of the conditions including the material, concentration and temperature of the poor solvent in the polymer deposition step, it is possible to rapidly exchange the good solvent and poor solvent on the surface in the direction of thickness of the polymer mixture layer. Rapid exchange of the good solvent and poor solvent on the surface in this manner causes polymer aggregation of the polymer material, and the polymer material is more finely deposited than toward the inside in the thickness direction. Meanwhile, although the exchange between the good solvent and the poor-dissolving solvent is slower toward the inside than in the surface, it proceeds relatively rapidly and uniformly, forming relatively thin fibrils and forming uniform gaps (which later become the pores) of a common size. This gives layers with different forms of deposition of the polymer material on the surface and toward the inside in the direction of thickness of the polymer mixture layer.

Next, drying of the polymer mixture layer in the drying step removes the solvent in the fibril gaps at the inside, uniformly forming pores of a common size and producing a sponge-like structure. On the surface, meanwhile, the solvent in the gaps of the finely deposited polymer aggregates is removed, producing a structure with dense pores of a smaller pore size than at the inside.

It is thus possible to obtain a porous film on the surface of the electrode plate which is provided with a sponge-like inside and a surface with dense pores of a smaller pore size than at the inside, in the direction of the film thickness.

This aspect, therefore, is used with the sixth to tenth aspects, and has an effect whereby the electrode provided with the porous film can be easily and economically formed. In addition, since it involves no drawing step such as required for film separators commonly provided as separate members, there is no thermal shrinkage due to increased battery temperature, and therefore short-circuiting between the positive plate and negative plate can be prevented and the safety enhanced.

(Twelfth aspect)

The twelfth aspect of the invention is characterized in that in the electrode plate-forming step of the eleventh aspect, an electrode active material, a hydrophilic polymer material with hydrophilic groups, a crosslinking agent that can cause a binding reaction with the hydrophilic groups for binding, and an aqueous solvent are combined to form a crosslinked polymer by crosslinking the hydrophilic polymer material with the crosslinking agent that has undergone binding reaction with the hydrophilic groups, and preparing an active material-containing mixture with the crosslinked polymer dispersed in the electrode active material, thereafter, the active material-containing mixture is applied to a collector and the electrode active materials is bound together by the crosslinked polymer to form the electrode plate.

According to this aspect, when the electrode active material, the hydrophilic polymer material, the crosslinking agent and the aqueous solvent are combined under prescribed conditions such as high temperature, etc., the hydrophilic polymer material is crosslinked by the crosslinking agent that has undergone binding reaction with the hydrophilic groups, forming a crosslinked polymer. The crosslinked polymer binds the electrode active material. Thus, the hydrophilic polymer material with hydrophilic groups and the crosslinking agent with functional groups that can bind with the hydrophilic groups by hydrolysis reaction become the binder of the electrode active material layer. The aqueous solvent used may be water or an aqueous solution, alcohol, etc.

According to this aspect the hydrophilic polymer material may be easily dispersed in the aqueous solvent. This aspect, therefore, allows an aqueous solvent to be used to easily prepare an active material-containing mixture in which the hydrophilic polymer material is satisfactorily dispersed in the electrode active material. When an electrode plate is formed using this active material-containing mixture, the hydrophilic polymer material is present as a satisfactory dispersion in the electrode active material, and therefore the electrode active materials have excellent bindability to each other. That is, since the electrode active materials are stably bound together by the hydrophilic polymer material, the electrode plate can reliably accomplish a satisfactory battery reaction.

Because aqueous solvents have lower flammability and volatility than organic solvents, they are very safe solvents. They are very safe for humans and are also easy to handle. It thus becomes possible to more easily accomplish the electrode plate-forming step using simpler apparatuses. The solvent collecting equipment is also less complex than the solvent collecting equipment for organic solvents. As a result, the cost of the electrode plate-forming step can be minimized.

Incidentally, methods of preparing active material-containing mixtures using aqueous solvents are known by combining rubber latexes with aqueous polymer materials such as cellulose, etc., such as disclosed in Japanese Unexamined Patent Publication (Kokai) No. 4-342966.

However, conventional active material-containing mixtures have not had sufficiently high wettability with respect to collector sheets. It has therefore been difficult to form active material mixture layers of uniform thickness on the surfaces of collector sheets, since the active material-containing mixtures applied onto collector sheets form globular aggregates (or "ball up"). There has also not been sufficiently high adhesion between the collector sheet and the electrode active material layer comprising the active material-containing mixture, and the often repeated use of such batteries has led to peeling of the electrode active material layer from the collector sheet, resulting in the problem of lower battery performance, including lower cycle properties.

According to this aspect, the wettability of the active material-containing mixture with respect to the collector sheet is higher than conventional active material-containing mixtures because the surface tension of the active material-containing mixture is lower due to the functional groups of the crosslinking agent. The active material-containing mixture can therefore be more easily applied onto the surface of the collector sheet, allowing the active material mixture layer to be easily formed to a uniform thickness.

Because the crosslinked polymer has excellent bindability not only to the electrode active material but also to the collector sheet, it can satisfactorily bind not only the active materials to each other but also the electrode active material and the collector sheet. The adhesion between the electrode active material layer and the collector sheet can therefore be improved. As a result, since the electrode active material layer does not easily peel from the collector sheet, the cycle properties of the battery can be improved, and reduction in battery performance with often repeated used of the battery can be easily prevented.

According to this eleventh aspect, when the porous film is integrally formed on the surface of the electrode plate formed in the electrode plate-forming step, the electrode plate is exposed to the good solvent for the polymer material in the polymer mixture layer-forming step, while the polymer mixture layer is exposed to a poor solvent for the polymer material in the subsequent polymer deposition step. In particular, when an organic solvent is used as the good solvent and water, an alcohol, a ketone or an alkane such as decane is used as the poor solvent, the polymer mixture layer is exposed to solvents of a vastly different nature, oily and aqueous. In the electrode plate-forming step it is therefore necessary to form an electrode plate which is non-soluble in both the good solvent and the poor solvent for the polymer material.

The crosslinked polymer formed by crosslinking the hydrophilic polymer material by the crosslinking agent that reacts with its hydrophilic groups possesses firm crosslinks, and it is therefore poorly soluble in both the well-dissolving and poor solvents for the polymer material, and is particularly insoluble in organic solvents and in water, alcohols, ketones, etc. With this aspect, therefore, in the electrode plate-forming step it is possible to form an electrode plate which is both organic solvent-resistant and water-resistant.

According to this aspect, an effect is provided whereby an electrode which allows a more satisfactory battery reaction to be reliably accomplished can be economically manufactured, the range of selection for the solutions used in the polymer coating step and polymer deposition step is wider and control over the quality of the porous film is made easier, in addition to the effect of the eleventh aspect.

With this aspect, a pH adjuster or the like may be added to the active material-containing mixture depending on the crosslinking agent used, to render the crosslinking agent more soluble in the active material mixture.

The content of the crosslinking agent in the active material-containing mixture may also be appropriately selected depending on the content of the hydrophilic polymer material, for satisfactory crosslinking of the hydrophilic polymer material. If the content of the crosslinking agent is too large with respect to the content of the electrode active material, it will coat the surface of the electrode active material and thus lower the battery reactivity of the electrode active material, resulting in lower electrode performance. The content of the crosslinking agent is therefore preferably selected as appropriate depending on the content of the electrode active material as well as the content of the hydrophilic polymer material, and more preferably it is also selected as appropriate depending on the particle shape and specific surface area of the electrode active material.

According to this aspect it is preferred to prepare the active material-containing mixture by either of the following two procedures.

(1) After dissolving the crosslinking agent in the aqueous solvent to the prescribed concentration, a prescribed amount of the electrode active material is added and the solution is stirred. A prescribed amount of the hydrophilic polymer material is then added to the solution which is thoroughly kneaded to obtain a paste-like active material-containing mixture.

(2) A prescribed amount of the electrode active material is added to and thoroughly stirred with the aqueous solvent. A prescribed amount of the hydrophilic polymer material is then added to the solution which is thoroughly kneaded to obtain a paste-like active material-containing mixture. Finally, the crosslinking agent is mixed with the active material-containing mixture. When mixing the crosslinking agent, if the crosslinking agent is a solid (powder) it is preferably dissolved first in an aqueous solvent and then combined with the active material-containing mixture. On the other hand, if the crosslinking agent is liquid, it is preferably mixed directly with the stock solution to prevent drastic changes in the viscosity of the active material-containing mixture.

(Thirteenth aspect)

The thirteenth aspect of the invention is characterized in that, in the electrode plate-forming step of the aforementioned twelfth aspect, the hydrophilic groups are hydroxyl groups. The hydrophilic polymer material crosslinked by binding groups produced by reaction of hydroxyl groups can form a very strong crosslinked structure because of their strong polarity compared to other hydrophilic group-based binding groups. With this aspect, then, it is possible to further improve the non-solubility of the binder with respect to the good solvent and poor solvent, and to form an electrode plate which is both organic solvent-resistant and water-resistant.

According to this aspect, an effect is provided whereby the range of selection for both the good solvent used in the polymer coating step and the poor solvent used in the polymer deposition step is wider and control over the quality of the short-circuit preventing layer and the porous film is made easier, in addition to the effect of the twelfth aspect.

With this aspect, the crosslinking agent used is one with functional groups that can bind by a binding reaction with the hydroxyl groups.

(Fourteenth aspect)

The fourteenth aspect of the invention is characterized in that in the aforementioned thirteenth aspect, the hydrophilic polymer material is at least one from among carboxymethyl cellulose, methyl cellulose, ethyl cellulose, polyvinyl alcohol, polyacrylic acid salts and polyethylene oxide.

These hydrophilic polymer materials all have hydroxyl groups and are also relatively easy to obtain and inexpensive. With this aspect, then, it is possible to easily and economically form an electrode plate with excellent non-solubility in the good solvent and the poor solvent.

All of these hydrophilic polymer materials can provide excellent organic solvent resistance, and can therefore render the electrode plate very highly insoluble in organic solvents. Thus, when an organic solvent is used as the good solvent in the polymer mixture layer-forming step, very high insolubility is afforded with respect to the good solvent.

According to this aspect, therefore, an effect is provided whereby the range of selection for the good solvent used in the polymer coating step is wider and control over the quality of the short-circuit preventing layer and the porous film is made even easier, while the electrode provided with the short-circuit preventing layer and the porous film can be manufactured more easily and economically, in addition to the effect of the thirteenth aspect.

With this aspect, the carboxymethyl cellulose, methyl cellulose, ethyl cellulose, polyvinyl alcohol and polyethylene oxide may also be used in the form of salts, such as sodium salts.

(Fifteenth aspect)

The fifteenth aspect of the invention is characterized in that in any one of the aforementioned twelfth to fourteenth aspects, the crosslinking agent has hydrophilic groups. Since the crosslinking agent used for this aspect has hydrophilic groups it can be easily dissolved in aqueous solvents. It can therefore be thoroughly distributed in the active material-containing mixture to cause effective crosslinking of the hydrophilic polymer material.

For this aspect it is particularly preferred for the crosslinking agent to be one with vinyl, glycidoxy, amino, diamido or ureido functional groups. These crosslinking agents have high affinity for water or aqueous solutions at pH 7. Since they can therefore dissolve easily in water or aqueous solutions at pH 7, it becomes unnecessary to add a pH adjuster or the like to the active material-containing mixture. As a result, the cost for preparation of the active material-containing mixture can be lowered.

Amino and diamido functional groups are the preferred functional groups among the functional groups mentioned above. These functional groups all have excellent resistance to reduction and therefore even when the electrode is used at a strong reduction potential, the crosslinking of the hydrophilic polymer material is maintained. Reduced binding strength between the electrode active materials and between the electrode active material in the electrode and the collector sheet is therefore avoided.

(Sixteenth aspect)

The sixteenth aspect of the invention is characterized in that, in any one of the aforementioned twelfth to fifteenth aspects, the crosslinking agent is at least one from among silane coupling agents, titanium coupling agents, urea formalin resins, methylol-melamine resins, glyoxal and tannic acid.

Since these crosslinking agents have functional groups with excellent reactivity for the hydroxyl groups of the hydrophilic polymer material, they can effectively cause crosslinking of the hydrophilic polymer material. It thus becomes possible to more easily and reliably crosslink the hydrophilic polymer material. That is, the crosslinking density of the hydrophilic polymer material is highest and the crosslinks of the hydrophilic polymer material can be stronger, even within the aforementioned fourteenth aspect. As a result it is possible to improve the non-solubility of the electrode plate in the good solvent and the poor solvent.

These crosslinking agents are also relatively easy to obtain and inexpensive. Consequently it is possible to easily and economically form an electrode plate with excellent non-solubility with respect to the good solvent and the poorly dissolving solvent.

According to this aspect, therefore, an effect is provided whereby the range of selection for both the good solvent used in the polymer coating step and the poor solvent used in the polymer deposition step is wider and control over the quality of the short-circuit preventing layer and the porous film is made even easier, while the electrode provided with the short-circuit preventing layer and the porous film can be manufactured more easily and economically, in addition to the effects of the twelfth to fourteenth aspects.

Incidentally, according to this aspect it is preferred to use a silane coupling agent, among the crosslinking agents mentioned above. Silane coupling agents have alkoxy groups, and the alkoxy groups hydrolyze in the active material-containing mixture to produce silanol groups. Since silanol groups readily undergo binding reaction with hydroxyl groups, it is possible to effectively crosslink hydrophilic polymers with hydroxyl groups. Very strong crosslinks can thus be created in the hydrophilic polymer material with hydroxyl groups. The silanol groups can also improve the wettability of the active material-containing mixture. It thereby becomes easier to coat the active material-containing mixture onto the surface of the collector sheet, thus facilitating formation of an active material mixture layer of uniform thickness.

Preferred among silane coupling agents are those with vinyl, glycidoxy, amino, diamido and ureido functional groups, and more preferred are those with amino and diamido functional groups. As an example of such a silane coupling agent there may be mentioned γ-aminopropyltriethoxysilane. Such a silane coupling agent will be readily dispersible in the active material-containing mixture and can effectively crosslink the hydrophilic polymer material.

The content of the silane coupling agent in the active material-containing mixture is preferably selected as appropriate depending on the amounts of the hydrophilic polymer material and the electrode active material, as well as on the particle shape and specific surface area of the electrode active material, for the same reasons given for limiting the content of the crosslinking agent as explained for the aforementioned eleventh aspect. It is particularly preferred for the silane coupling agent content to be no greater than 4 wt % with respect to 100 wt % as the total active material-containing mixture. If the silane coupling agent content exceeds 4 wt %, it will excessively coat the surface of the electrode active material and thus lower the battery reactivity of the electrode active material.

(Seventeenth aspect)

The seventeenth aspect of the invention is characterized in that, in any one of the aforementioned twelfth to sixteenth aspects, the crosslinking agent contained in the active material-containing mixture has functional groups that undergo binding reaction with the hydrophilic groups in the hydrophilic polymer material, in the same number as or greater number than the hydrophilic groups.

With this aspect, the crosslinking agent can undergo crosslinking reaction with all or almost all of the hydrophilic groups in the hydrophilic molecule material. That is, it is possible to achieve particularly high crosslinking density of the hydrophilic polymer material and particularly strong crosslinks in the hydrophilic polymer material, for the aforementioned twelfth to sixteenth aspects. As a result, the non-solubility of the electrode plate in the good solvent and poor solvent can be especially improved.

According to this aspect, therefore, an effect is provided whereby the range of selection for both the good solvent used in the polymer coating step and the poor solvent used in the polymer deposition step is wider and control over the quality of the short-circuit preventing layer and the porous film is made even easier, in addition to the effects of the twelfth to sixteenth aspects.

For example, if a silane coupling agent: $H_2NC_3H_6Si(OC_2H_5)_3$ is added to carboxymethyl cellulose sodium salt: $C_6H_7O_2(OH)_2OCH_2OONa$, where the molecular weight of the carboxymethyl cellulose sodium salt is 242, the number of hydroxyl groups dissolved in water is 3, the molecular weight of the silane coupling agent is 221 and the number of hydrolyzing groups is 3, it is preferred for the silane coupling agent to be added at least to $(221/3)/(242)/3)=0.91$, with respect to the carboxymethyl cellulose weight.

(Eighteenth aspect)

The eighteenth aspect of the invention is characterized in that, in any one of the aforementioned eleventh to seventeenth aspects, the polymer mixture comprises a mutual mixture of the polymer material and a salt.

With this aspect, the salt is extracted into the poor solvent in the polymer deposition step, forming pores that allow the electrolytes to pass through the porous film. It is thereby possible to easily form a porous film with excellent electrolyte permeability on the surface of the electrode plate. The pore size of the porous film can also be easily controlled by merely selecting the amount of salt added.

According to this aspect, therefore, an effect is provided whereby an electrode can be easily formed having a porous film with excellent electrolyte permeability, in addition to the effects of the eleventh to seventeenth aspects. By using an electrode manufactured according to this aspect in a laminate-type battery, high output characteristics can be easily achieved and superior battery performance can be easily exhibited.

(Nineteenth aspect)

The nineteenth aspect of the invention is characterized in that, in the aforementioned eighteenth aspect, the salt is at least one from among lithium chloride, lithium nitrate, lithium iodide, lithium tetrafluoroborate, lithium bistrifluoromethylsulfonylimide and lithium hexafluoroarsenate. Because these lithium salts have excellent solubility in the poor solvent, the salts are extracted more readily into the poor solvent and pores that allow permeation of the electrolytes can be formed with particular ease in the porous film. These lithium salts are also relatively easy to obtain and inexpensive. It thus becomes possible to easily and economically form porous films with excellent electrolyte permeability.

According to this aspect, therefore, an effect is provided whereby an electrode can be inexpensively formed having a porous film with excellent electrolyte permeability, in addition to the effect of the eighteenth aspect.

Incidentally, when an electrode manufactured according to this aspect is used in a lithium secondary battery, even if such lithium salts remain in the porous film it is possible to prevent reaction between the remaining lithium salt and the lithium salt contained in the electrolyte solution. Even if the salts contained in the porous film dissolve out into the electrolyte solution, there is no effect on the electrode reaction so that excellent battery performance can be maintained.

(Twentieth aspect)

The twentieth aspect of the invention is characterized in that, in either of the aforementioned eighteenth and nineteenth aspects, the polymer mixture contains the salt at 5 parts by weight or greater with respect to 100 parts by weight of the polymer material. If the concentration of the lithium salt in the polymer mixture is under 5 parts by weight the size of the pores formed in the porous film will be too small, making it difficult to achieve excellent electrolyte permeability. This will impede the excellent battery performance, such as high output characteristics, for the laminate-type battery. Since the lithium salt concentration is controlled to 5 parts by weight or greater according to this aspect, it is possible to more easily form pores in the porous film to a size sufficient to allow permeation of the electrolytes. A porous film with excellent electrolyte permeability can thus be formed more easily.

According to this aspect, therefore, an effect is provided whereby an electrode with excellent electrolyte permeability can be easily manufactured, in addition to the effects of the aforementioned eighteenth and nineteenth aspects.

On the other hand, it is also preferable for the concentration of the lithium salt in the polymer mixture to be no greater than 20 parts by weight with respect to 100 parts by weight of the polymer material. If the lithium salt concentration exceeds 20 parts by weight the pores in the porous film will be too large, making it difficult to achieve a porous film with excellent performance, such as a shutdown function. Since the lithium salt concentration is controlled to no greater than 20 parts by weight according to this aspect, it is possible to easily form pores in the porous film to a size sufficient to provide a shutdown function. A porous film with excellent performance including a shutdown function can thus be formed more easily.

According to this aspect, therefore, an effect is provided whereby an electrode having a porous film with excellent performance including a shutdown function can be easily manufactured, in addition to the effects of the aforementioned eighteenth and nineteenth aspects.

BRIEF DESCRIPTION OF THE DRAWINGS

The present invention will now be explained with reference to the attached drawings which, however, do not restrict the invention in any way.

FIG. 21 is a set of drawings showing the positive plate of the laminated electrodes in the laminate-type battery of Example 13.

FIG. 23 is a set of drawings showing the condition of the positive pole active material layer formed on the positive collector sheet in the laminate-type battery of Example 13.

FIG. 24 is a set of drawings showing the negative plate of the laminated electrodes in the laminate-type battery of Example 13.

FIG. 25 is a set of drawings showing the condition of the negative pole active material layer formed on the negative collector sheet in the laminate-type battery of Example 13.

DESCRIPTION OF THE PREFERRED EMBODIMENT

The coiled electrode battery of the present invention will now be explained by way of the following non-limitative examples in order to provide a degree of detail allowing it to be accomplished by a person skilled in the art.

EXAMPLE 1

Construction of Example 1

Figure 1:
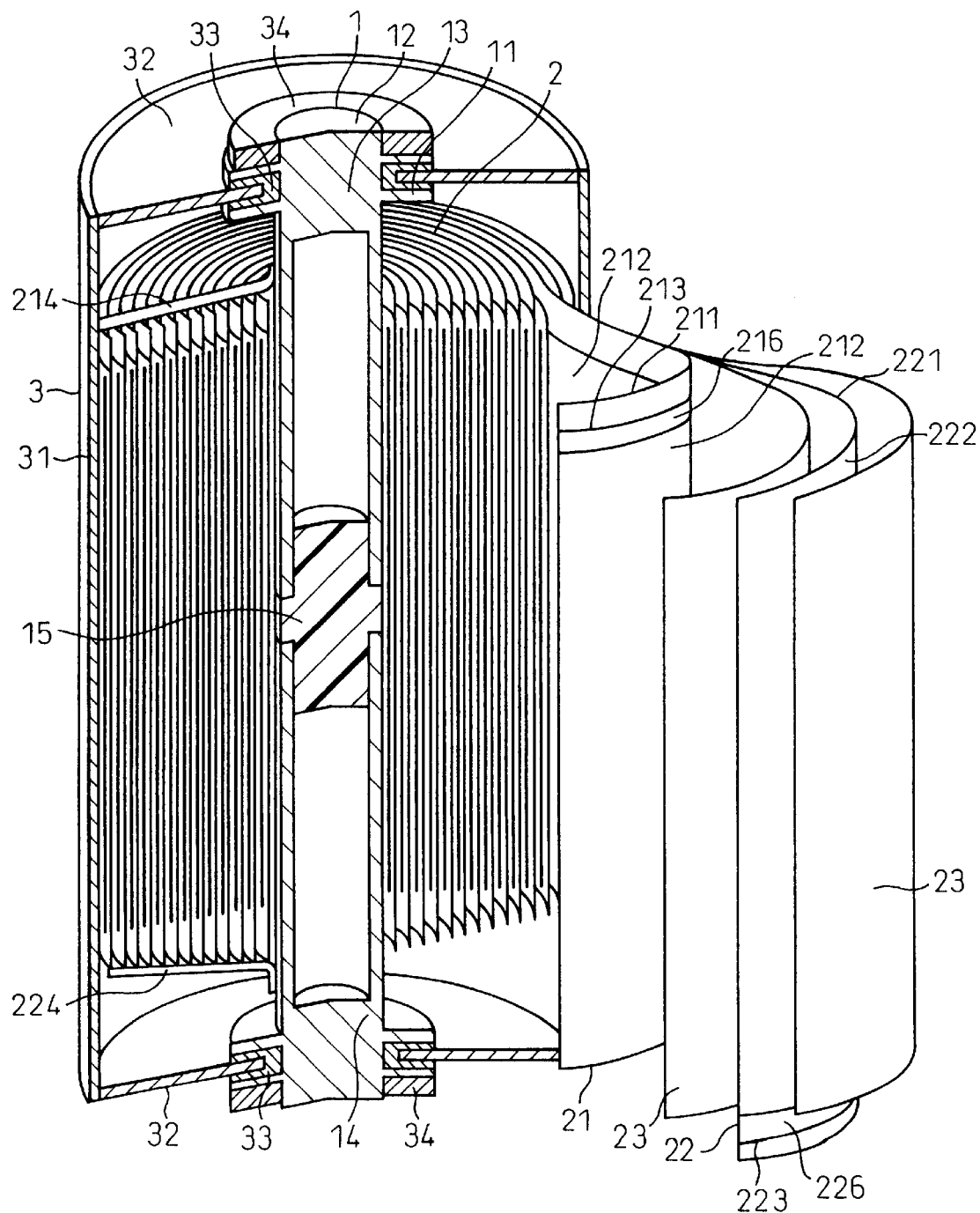
FIG. 1 is a cross-sectional perspective view showing the overall construction of the coiled electrode battery of Example 1.

As shown in FIG. 1, the coiled electrode battery of this example has a construction basically consisting of a core rod 1 having a positive electrode terminal 13 and a negative electrode terminal 14 at either end, a coiled electrode 2 comprising a positive plate 21, a negative plate 22 and two separators 23, and a case 3.

The core rod 1 is the coiled axis core of the coiled electrode 2, and it has a positive electrode terminal 13 and a negative electrode terminal 14 which protrude from the case 3 as a pair in opposite directions at either end in the direction of the coiled axis length, and supply power externally. Specifically, the core rod 1 is constructed of a positive electrode terminal 13, a negative electrode terminal 14, and an insulating connecting pin 15 that lies between the electrode terminals 13, 14, insulating and connecting the electrode terminals 13, 14.

The positive electrode terminal 13 is a closed-ended, roughly hollow cylindrical metal member, and it has a flange 11 formed in the middle and positioned inside the case 3, and a closed-ended tip having a male screw formed around its outer perimeter. The negative electrode terminal 14 is constructed of the same material as the positive electrode terminal 13. The connecting pin 15 is a roughly cylindrical member made of a synthetic resin, having at the center a wide-diameter section separating the positive electrode terminal 13 and the negative electrode terminal 14, and it is fitted with both electrode terminals 13, 14 to connect both terminals 13, 14.

The coiled electrode 2 comprises a belt-like positive plate 21 and negative plate 22 and two belt-like separators 23 that lie between both of the poles 21, 22 and are wound up with both poles 21, 22. That is, the coiled electrode 2 has a construction wherein the positive plate 21, negative plate 22 and two separators 23 are coiled around the core rod 1 as the axis.

The positive plate 21 comprises a collector sheet 211 made of a belt-shaped aluminum foil which has a protrusion 213, and a positive pole active material layer 212 such as lithium manganate coated in a rectangular region on both sides of the collector 211. Similarly, the negative plate 22 comprises a collector sheet 221 made of a belt-shaped copper foil which has a protrusion 223, and a negative pole active material layer 222 such as carbon coated in a rectangular region on both sides of the collector 221. The two separators 23 are thin-film porous resin sheets formed from polyethylene (or alternatively polypropylene, etc.) with a belt-like planar shape.

The protrusion 213 of the positive plate 21 and the protrusion 223 of the negative plate 22 are formed protruding on opposite sides with respect to the coiled axial length direction. Here, the protrusions 213, 223 are the metal foil sections of each of the collectors 211, 221 that are not coated with the active materials 212, 222, and the active materials 212, 222 are only coated on the rectangular regions of the collectors 211, 221 of the positive plate 21 and negative plate 22 which are separated by the separators 23.

The protrusions 213, 223 of the positive and negative poles 22, 22 have insulating layers 216, 226 of a prescribed width formed at their proximal sections on the inner surface and outer surface, as short-circuit preventing layers. The insulating layers 216, 226 are formed by using a hot melt method to thinly coat polyethylene which is a resin that is insoluble in the electrolyte solution.

Figure 2:
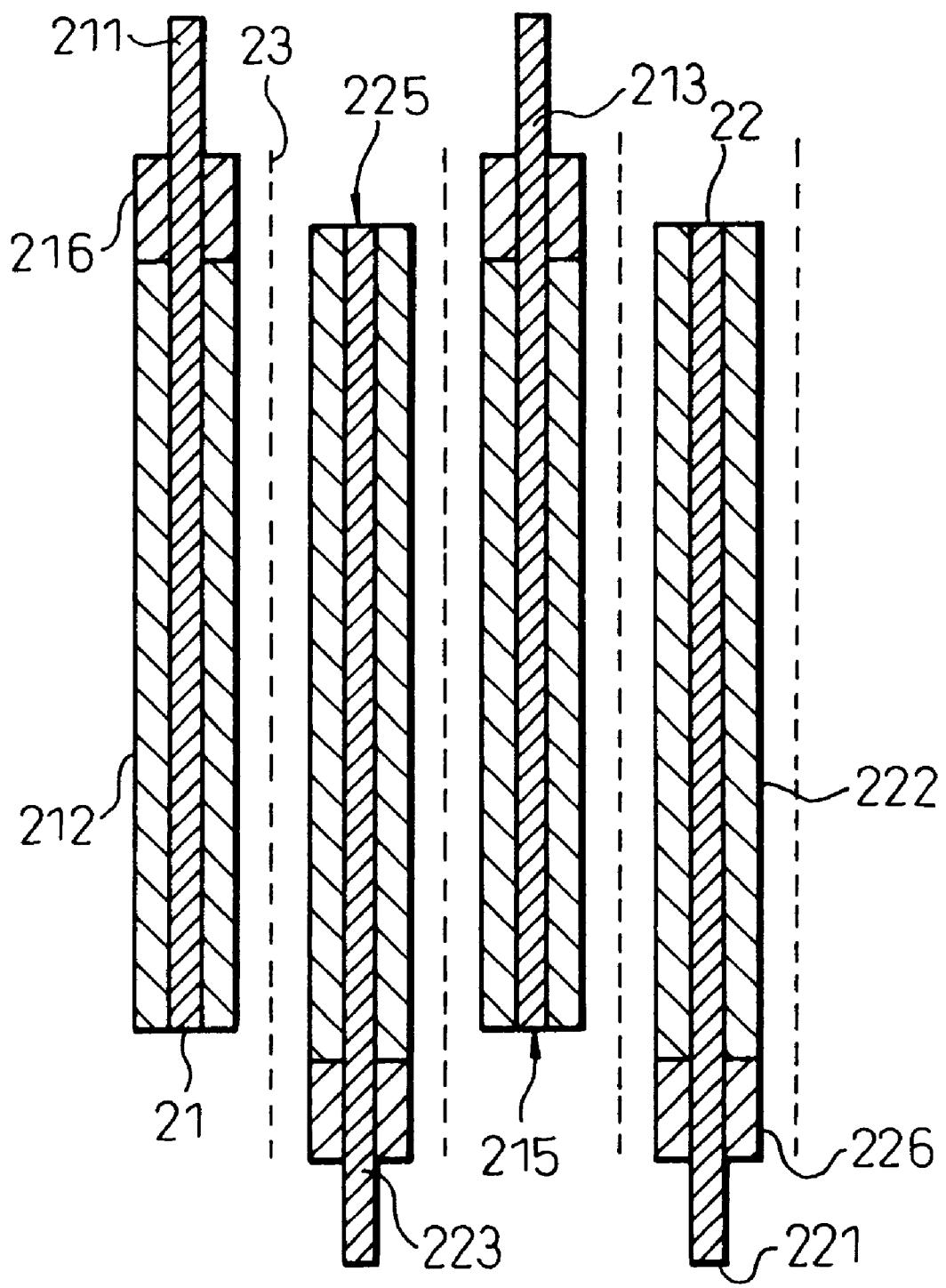
FIG. 2 is a schematic cross-sectional view showing the construction of the coiled electrodes of Example 1.

Thus, as shown in FIG. 2, the separator is sandwiched between the protrusions 213, 223 of both the positive and negative poles 21, 22 and the non-protruding sections 215, 225 of their opposite poles. In other words, while the protrusions 213, 223 of one pole and the non-protruding sections 215, 225 of the other pole are insulated by the separator 23, they are also insulated by the insulating layers 216, 226.

Consequently, even in the case of winding misalignment occurring in the coiling step such that the separator 23 shifts from between the protrusions 213, 223 of either of the poles and the non-protruding sections 215, 225 of the other pole, the presence of the insulating layers 216, 226 prevent short-circuiting between the poles 21, 22. That is, the insulating layer 216 formed on the surface of the proximal section of the protrusion 213 of the positive plate 21 reliably prevents short-circuiting of the protrusion with the non-protruding section 225 of the negative plate 22. Likewise, the insulating layer 226 formed on the surface of the proximal section of the protrusion 223 of the positive plate 22 reliably prevents short-circuiting of the protrusion with the non-protruding section 215 of the negative plate 21.

Figure 3:
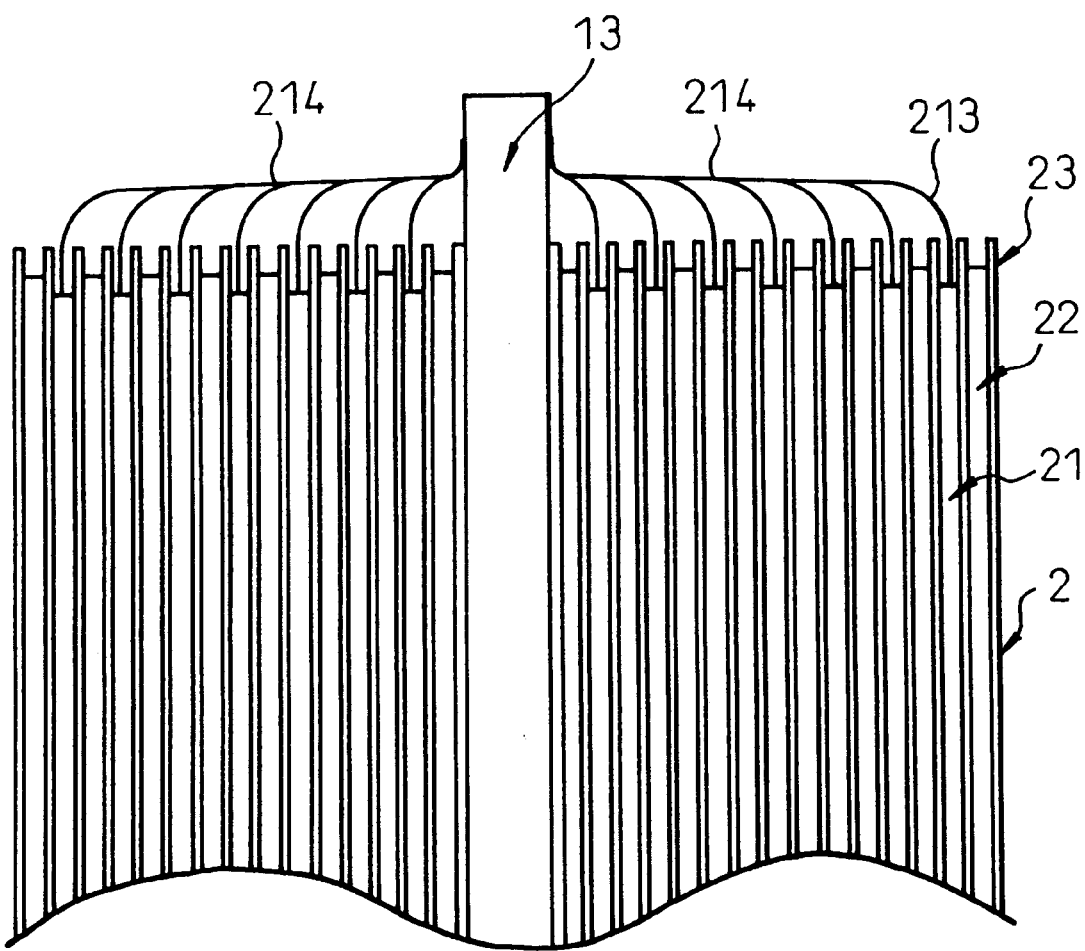
FIG. 3 is a longitudinal schematic cross-sectional view showing the electrode plates, etc. of the coiled electrodes of Example 1.

As shown in FIG. 3, the coiled electrode battery of this example has two collectors 214 (only one of which is shown in FIG. 1) which are connected to all the protrusions 213 of the positive plates 21 of the coiled electrode 2 along the radial direction, and also connected to the positive electrode terminal 13. The collectors 214 for the positive plate 21 consist of aluminum sheets which are of the same material as the aluminum foil forming the protrusions 213 of the positive plates 21, and they are rectangular tape-like conductor members with a thickness of about 1 mm. The collectors 214 are resistance welded to the tips of all the protrusions 213 of the positive plates 21 across almost the entirety along the radial direction, and are also resistance welded to the positive electrode terminal 13 at the tip in the centripetal direction.

Similarly, two collectors 224 (only one of which is shown in FIG. 1) are connected to all of the protrusions 223 of the negative plates 22 of the coiled electrode 2 in the radial direction, and are connected to the negative terminal 14 as well. The collectors 224 for the negative plate 22 consist of copper sheets which are of the same material as the copper foil forming the protrusions 223 of the negative plates 22, and they are rectangular tape-like conductor members with a thickness of about 1 mm. The collectors 224 are resistance welded to the tips of all the protrusions 223 of the positive plates 22 across almost the entirety along the radial direction, and are also resistance welded to the positive electrode terminal 14 at the tip in the centripetal direction.

Incidentally, the resistance welding between each of the tips of the protrusions 213 and the collectors 214 is accomplished either by broadly contacting the fan-shaped collector 214 with the tips of the protrusions 213 and conducting current, or by inserting a wide comb tooth-shaped electrode collector between each protrusion 213 and conducting current. The welding method is the same as for the resistance welding of the protrusions 223 of the negative plate 22 and the collector 224 (see FIG. 1).

The case 3, again as shown in FIG. 1, is constructed of a metallic cylinder 31 and two disk-shaped covers 32 which seal both open ends of the cylinder 31. Through-holes are formed at the centers of both covers 32, and the protrusions 12 of the positive electrode terminal 13 and the negative electrode terminal 14 protrude out from these through-holes while a flat washer-shaped nut 34 is screwed around each protrusion 12 to anchor each electrode terminal 13, 14 to its respective cover 32. Between each of the electrode terminals 13, 14 and nuts 34 and each of the covers 32 of the case 3 there are situated insulation packings 33 which hermetically seal the case 3 and provide insulation between the electrode terminals 13, 14 and the case 3.

Action and effect of Example 1

The coiled electrode battery of this example exhibits the following action and effect by its construction as described above.

As mentioned above, with coiled electrode batteries it is sometimes the case that winding misalignments occur during the coiling step, such that the separator 23 slips from between the protrusion 213 or 223 of one electrode and the non-protruding section 215 or 225 of the other electrode. In such cases as well, as also seen in FIG. 2, the presence of the insulating layers 216, 226 prevent short-circuiting between the electrodes 21, 22. That is, short-circuiting between the protrusion 213 of the positive plate 21 and the non-protruding section 225 of the negative plate 22 is reliably prevented by the insulating layer 216 formed on the surface of the proximal section of the protrusion 213. Even if a winding misalignment of the positive plate 21 occurs downward in FIG. 2 causing a situation where the non-protruding section 215 would contact with the protrusion 223 of the negative plate 22, such a situation is avoided by the insulating layer 226 of the negative plate 22. Similarly, short-circuiting between the protrusion 223 of the negative plate 22 and the non-protruding section 215 of the negative plate 21 is reliably prevented by the insulating layer 226 formed on the surface of its proximal section. In addition, since each electrode plate is fabricated by die-cutting from a metal sheet, metal burrs (like stubble) are easily produced at the die-cut edges. For example, even if burrs are present on the non-protruding section 225 of the negative plate 22 and those burrs punch through the separator 23, the insulating layer 216 of the positive plate 21 will prevent the burrs from contacting with the protrusion 211 of the positive plate 21.

Incidentally, in FIG. 2 the position of the non-protruding section 215 of the positive plate 21 is above the proximal section of the insulating layer 226 of the negative plate 22, but this position may of course be placed up to the interior in the lengthwise direction of the insulating layer 226.

According to the coiled electrode battery of this example, therefore, short-circuits between the positive and negative poles in the battery are reliably prevented so that an effect is provided whereby the defect rate by short-circuits in batteries is lowered and product yields are improved.

Modifications to Example 1

In Example 1 described above, the insulating layers 216, 226 were formed using a hot melt method to apply polyethylene onto the proximal sections of both sides of the protrusions 213, 223, but modifications are also possible by using other resins that are insoluble in the electrolyte solution or by using other coating methods for the application.

As examples of resins insoluble in electrolyte solutions there may be mentioned polyethylene, polypropylene, polyphenylene ether, etc. In addition there may also be used polybenzimidazole, polyimide, polyether imide, polyamidoimide, polyphenylene sulfide, polyethersulfone, polysulfone, polyether ketone, polymethylpentene, alamide, polyvinylidene fluoride, polyamide, polyethylene terephthalate, polybutylene terephthalate, polyallylate, polyacetal, etc. The type of resin used is determined in consideration of the properties, heat resistance temperature, workability and cost of the electrolyte solution.

Methods of forming the insulating layers 216, 226 include coating methods such as the hot melt method and solution casting method, and methods of attaching resin tapes with adhesives. An additional method is one involving oxidation of the surface of the proximal sections of the protrusions 213 and 223 of the metal foils forming the respective positive plate 21 and negative plate 22, to form insulating oxidation films.

Three or more collectors 214, 224 may also be used, or the collectors may be in other forms. The method of connecting the protrusions 213, 223 is not limited to resistance welding, and connecting methods such as laser welding and ultrasonic welding may also be employed.

EXAMPLE 2

Construction of Example 2

Figure 4:
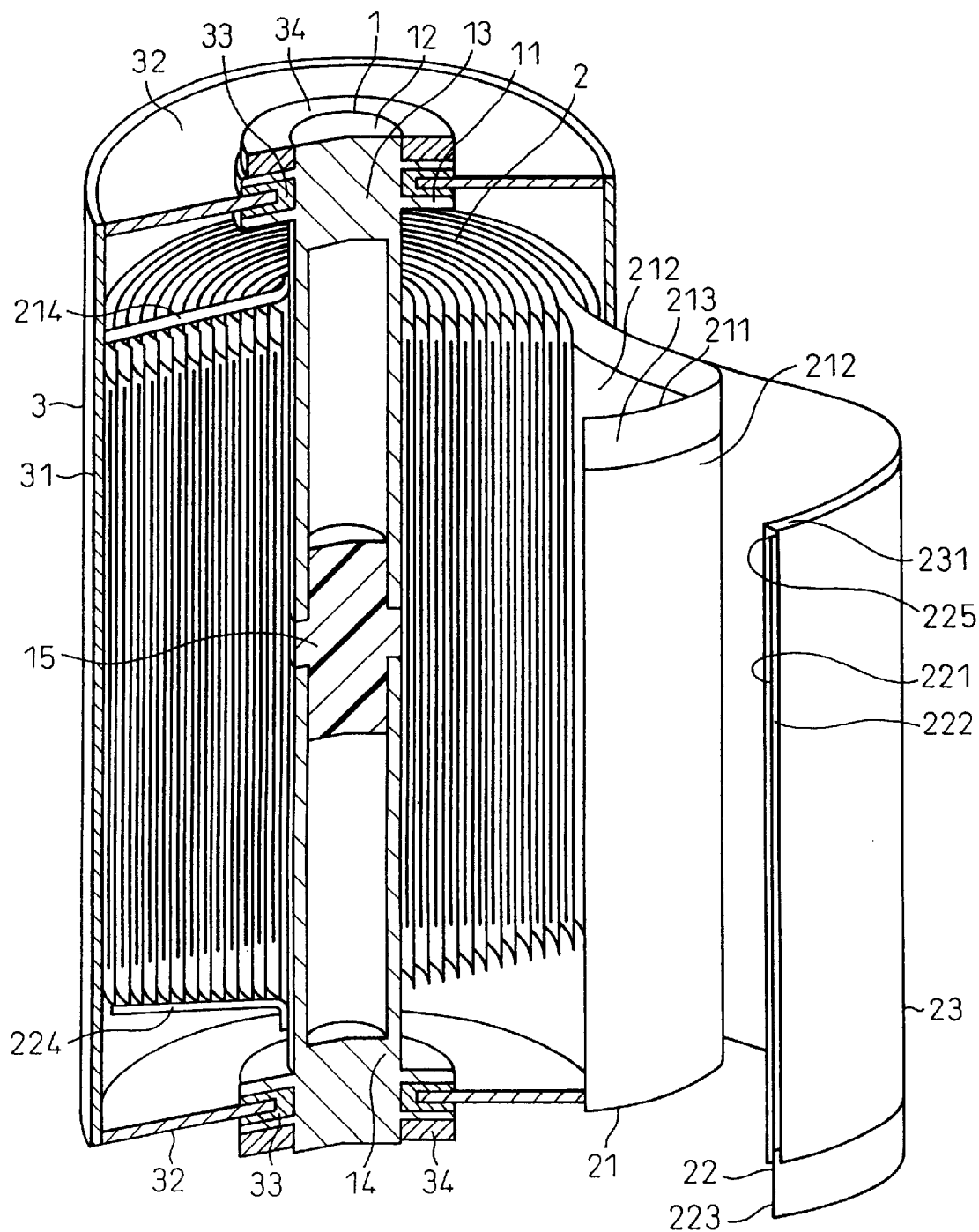
FIG. 4 is a cross-sectional perspective view showing the overall construction of the coiled electrode battery of Example 2.

As shown in FIG. 4, the coiled electrode battery of this example has separators 23 that cover both sides of the negative plate 22 while also covering the proximal section of the protrusion 223. That is, the separators 23 protrude out to the proximal section of the negative plate 22 and cover that proximal section, forming a short-circuit preventing layer.

Moreover, the two separators 23 covering both sides of the negative plate 22 are fused together at the sections where they contact the edge of the non-protruding section 225 of the negative plate 22, forming a fused section 231. The fused section 231 is fused by sandwiching the sections of the separators 23 bonded to the negative plate 22 between a pair of hot rollers between the coiling step for the coiled electrode. Most of the pores of the porous separators 23 at the fused section 231 are plugged, becoming generally insulative.

The construction of the rest of the coiled electrode battery of Example 2 is the same as the construction of Example 1 described above.

Action and effect of Example 2

Because the coiling step is carried out with two separators 23 joined on both sides of the negative plate 22, winding misalignment of the separators 23 does not occur.

Figure 5:
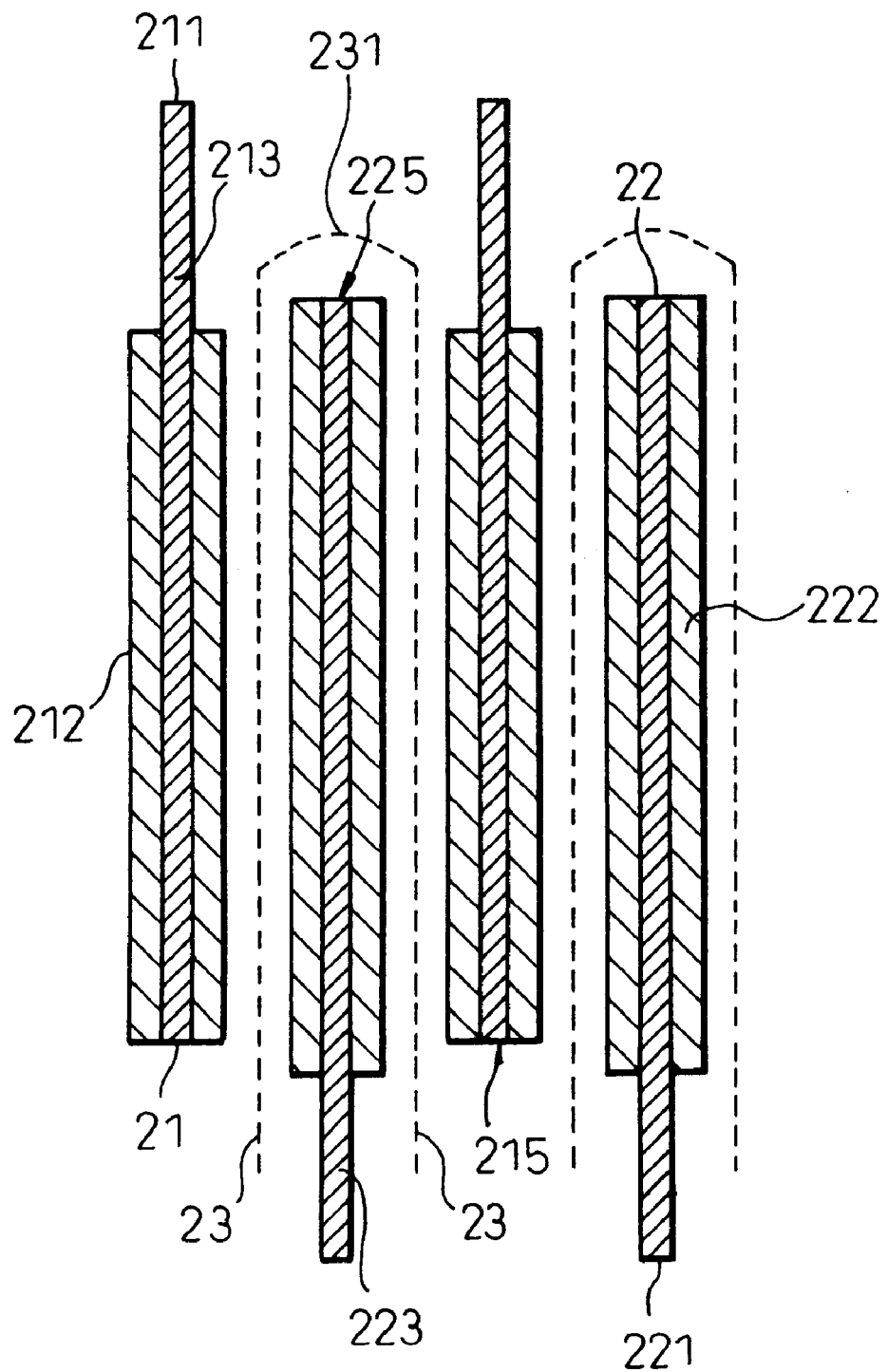
FIG. 5 is a schematic cross-sectional view showing the construction of the coiled electrodes of Example 2.
Figure 6:
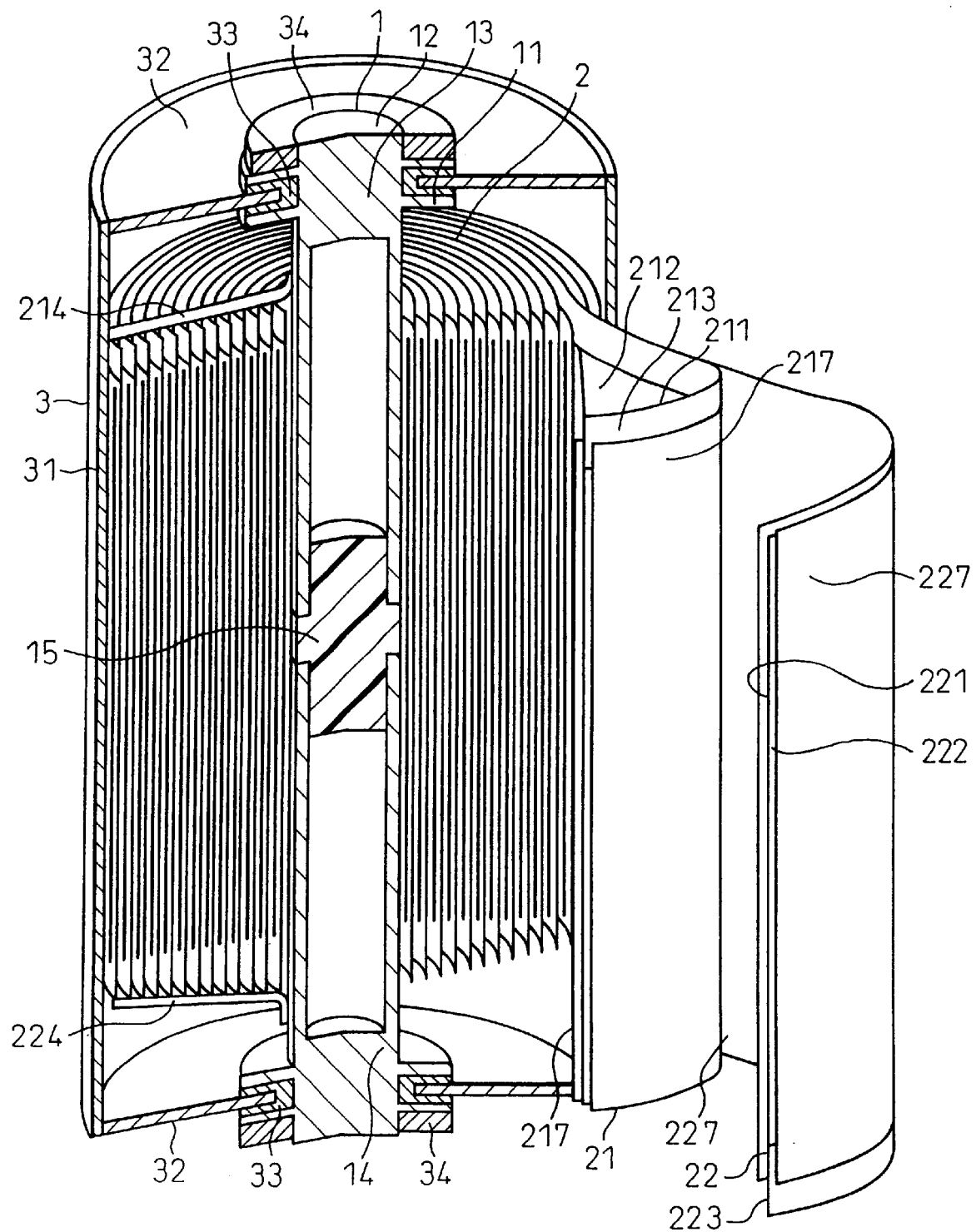
FIG. 6 is a cross-sectional perspective view showing the overall construction of the coiled electrode battery of Example 3.

Thus, as shown in FIG. 5, the proximal sections on both sides of the protrusion 223 of the negative plate 22 are covered by the separators 23, so that even if the non-protruding section 21 of the positive plate 21 shifts downward in FIG. 5 due to a winding misalignment, the non-protruding section 215 of the positive plate 21 does not contact with the protrusion 223 of the negative plate 22, and short-circuiting is prevented. Also, since the non-protruding section 225 of the negative plate 22 is covered by the fused section 231 between the two separators 23, even if a winding misalignment occurs it does not contact with the protrusion 213 of the positive plate 21, and short-circuiting is prevented.

Consequently, since short-circuiting between the positive and negative poles in the battery is reliably prevented by the coiled electrode battery of this example as well, an effect is provided whereby the defect rate by short-circuits in batteries is lowered and product yields are improved.

EXAMPLE 3

Construction of Example 3

As shown in FIG. 5, the coiled electrode battery of this example has the porous films 217, 227 formed up to the proximal sections of the protrusions 213, 223 on both sides of the positive and negative poles 21, 22. That is, the separators are porous films 217, 227 formed integrally with the electrode surfaces of the positive plate 21 and negative plate 22. In other words, porous films 217, 227 which have the same function as the film separators 23 are integrally formed by adhesion onto the surfaces of the positive and negative poles 21, 22, instead of the film separators 23 of Example 1 and Example 2 described above.

The construction of the rest of the coiled electrode battery of Example 3 is the same as the construction of Example 1 described above.

Production method of Example 3

The porous films 217, 227 formed on the positive and negative poles 21, 22 of this example were formed by the following forming method.

First, polyphenylene ether (trade name: NOLYL PPO534 by GE Plastics Co.) was dissolved in N-methylpyrrolidone at 10° C. to a solid concentration of 25%, to prepare a polymer solution. The polymer solution was then applied onto the positive and negative poles 21, 22 with a blade coater, over the active materials coated onto the surfaces of the aluminum foil and copper foil forming the positive and negative electrodes.

Next, the positive and negative poles 21, 22 coated with the polymer solution were immersed in water for 3 minutes, drawn out of the water, and dried to remove the water. Thus, porous films 217, 227 with a thickness of approximately 25 µm were formed on the surfaces of the positive and negative poles 21, 22.

Action and effect of Example 3

Figure 7:
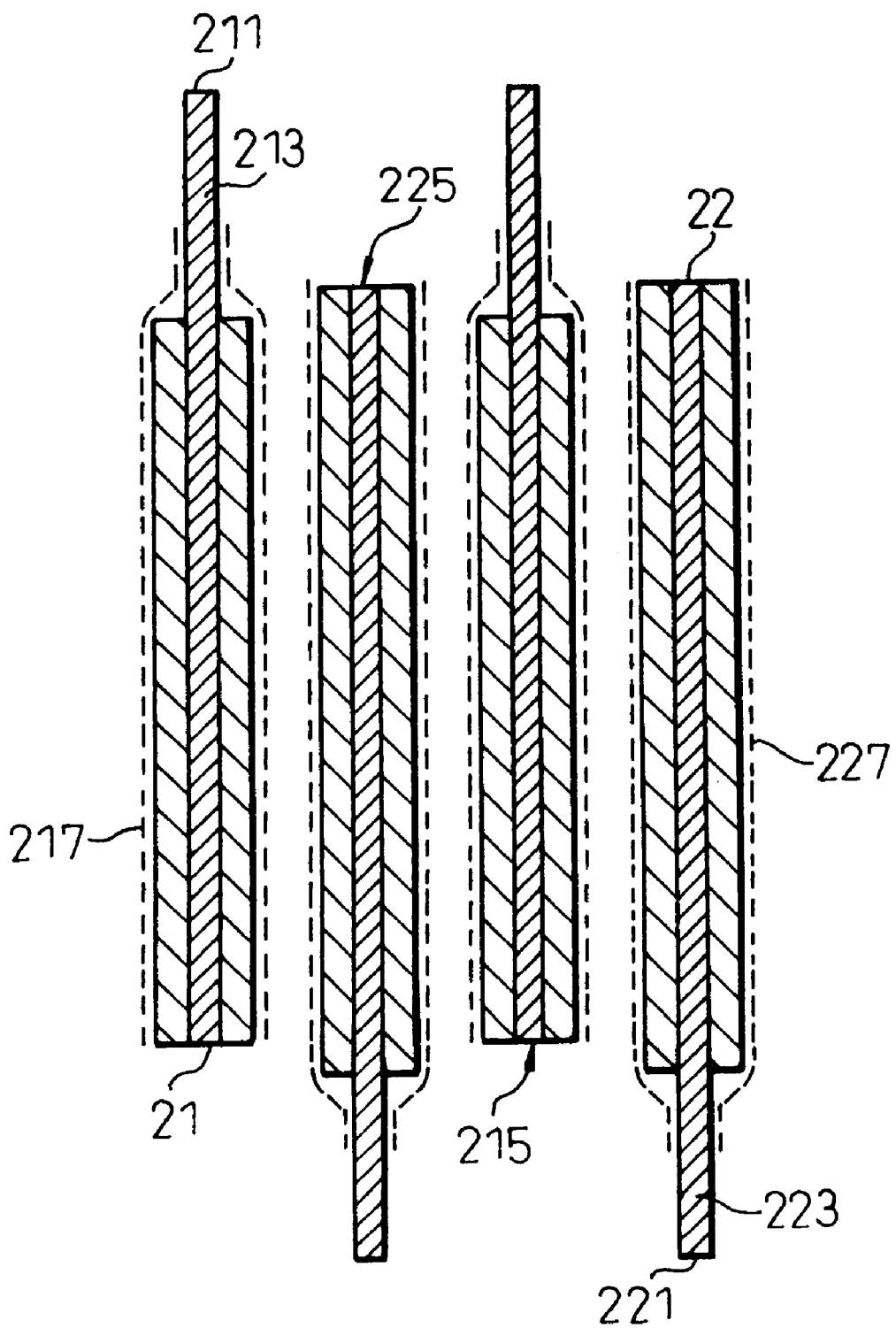
FIG. 7 is a schematic cross-sectional view showing the construction of the coiled electrodes of Example 3.

As shown in FIG. 7, the porous films 217, 227 are formed up to the proximal sections of the protrusions 213, 223 of the positive and negative poles 21, 22. The porous films 217, 227 therefore lie between the protrusions 213, 223 and the non-protruding sections 215, 225 to prevent short-circuiting. Consequently, short-circuiting between the positive and negative poles 21, 22 in the battery are effectively prevented with the coiled electrode battery of this example.

Moreover, since there are not two film separators 23 and only the two positive and negative poles 21, 22 with porous films 217, 227 are coiled in the coiling step, the coiling step is simplified. There is hence no risk of winding misalignment of the separators 23.

According to the coiled electrode battery of this example, therefore, an effect is provided whereby not only short-circuiting in the battery is prevented as with Examples 1 and 2 described above, but the coiling step for the coiled electrode is simplified to prevent a risk of winding misalignment and thus further improve yields.

Modifications to Example 3

The polymer material used to form the porous films 217, 227 may be any of various resins that are insoluble in the electrolyte solution of the coiled electrode battery in which it is used. For example, there may be used resins such as polyethylene and polypropylene, which are common materials for usual separators 23. In addition there may also be used polybenzimidazole, polyimide, polyether imide, polyamidoimide, polyphenylene ether, polyallylate, polyacetal, polyamide, polyphenylene sulfide, polyethersulfone, polysulfone, polyether ketone, polybutylene terephthalate, polyethylene terephthalate, polyethylene naphthalate, ethylene-cycloolefin copolymers, polyvinylidene fluoride, vinylidene fluoride-hexafluoropropylene-tetrafluoroethylene copolymer, and other resins.

As the solvent used for production of the polymer solution there may be used N-methylpyrrolidone, dimethylsulfoxide, dimethylsulfamide, dimethylacetamide, toluene, xylene, cyclohexane, heptane, etc. The solvent is selected to suit the type of resin.

In order to adjust the viscosity of the polymer solution to a degree suitable for application, a small amount of a thickener such as methyl cellulose, polyethylene oxide or polyvinyl alcohol may be added to the solvent. To obtain a homogeneous film with a uniform thickness, a surfactant, anti-foaming agent, surface adjuster or the like may be added to the solvent. In order to improve the strength of the porous films 217, 227, inorganic fibers such as glass fibers or carbon fibers, or polymer fibers such as alamide, polyphenylene sulfide or polyester may also be added to the solvent.

A salt may also be added to the polymer solution for the purpose of forming on the surface of the electrode a porous film with numerous finer pores. The salt is preferably a lithium salt, and preferred examples are lithium chloride, lithium nitrate, lithium iodide, lithium tetrafluoroborate, lithium bistrifluoromethylsulfonylimide and lithium hexafluoroarsenate. The content of the salt is preferably 5–20 parts by weight to 100 parts by weight of the polymer material.

The method of forming the porous films 217, 227 from the polymer solution obtained in this manner may be a coating method employing a die coater or a method employing a roll coater or knife coater. The method of depositing the porous films 217, 227 on the surface of the positive and negative poles 21, 22 may be a method of immersion in a poor solvent in which the resin in the polymer solution does not dissolve but only the solvent is dissolved, or a method of exposure in an atmosphere filled with vapor of the poor solvent. Employing this type of method will allow gelling and deposition of the resin after dispersion and liquefaction of the polymer solution. The deposited resin forms a dense skin layer on the surface, and forms a sponge layer with a high porosity in the interior, to produce porous films 217, 227 that function as separators.

The poor solvent will depend on the type of the aforementioned solvent, but water, an alcohol, a ketone, an alkane such as decane, etc. may be used. By the combination of the aforementioned solvent and the poor solvent it is possible to appropriately set the pore size, porosity, thickness, etc. of the skin layers of the porous films 217, 227 that are formed. In order to remove the solvent and the poor solvent after the polymer solution has gelled, the positive and negative poles 21, 22 may be dried in a thermostatic chamber, a vacuum drier or the like. To adjust the film thickness and porosity of the porous films 217, 227, the positive and negative poles 21, 22 on which the porous films 217, 227 have been formed may be subjected to roll pressing or flat pressing.

EXAMPLE 4

Construction of Example 4

Figure 8:
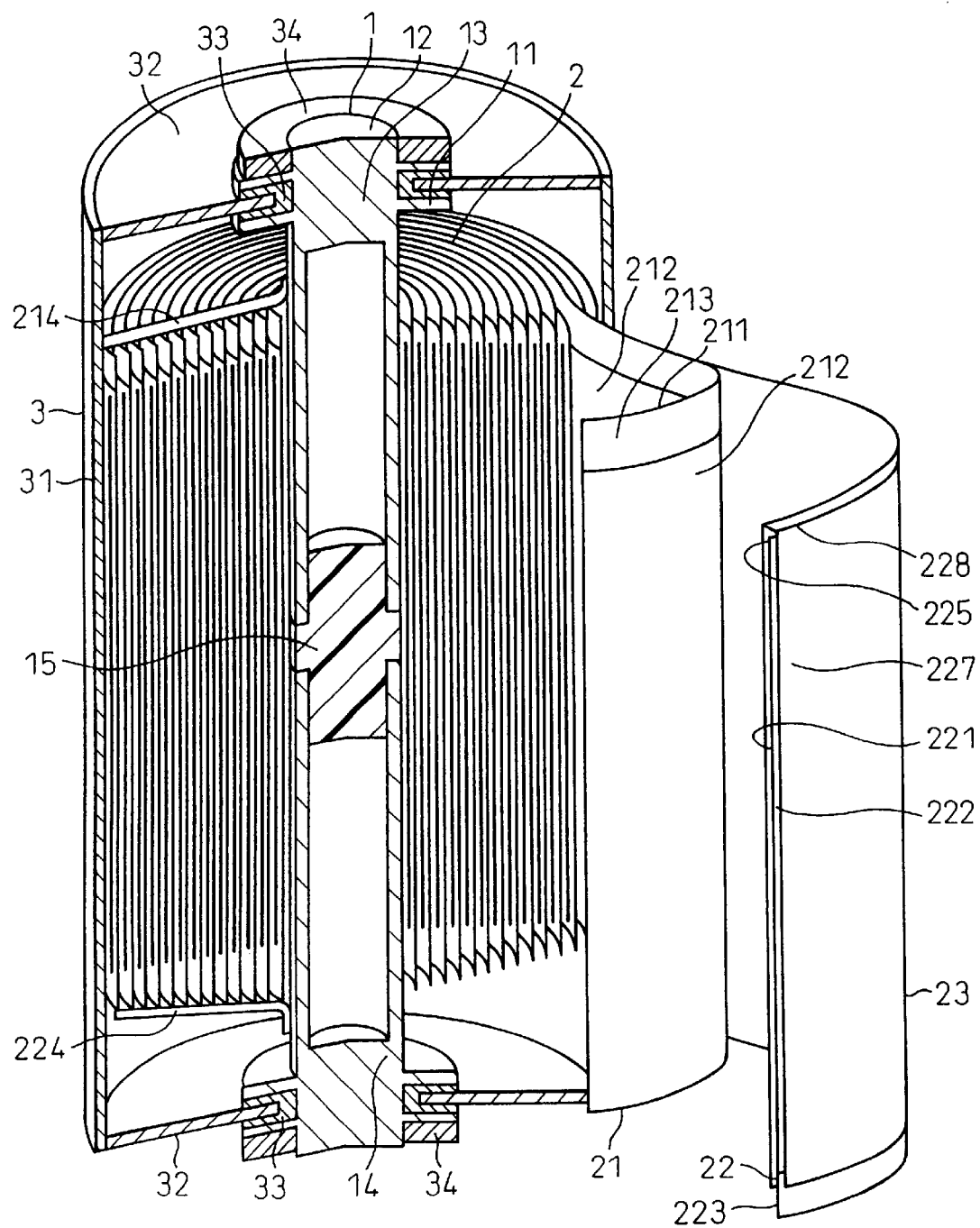
FIG. 8 is a cross-sectional perspective view showing the overall construction of the coiled electrode battery of Example 4.

As shown in FIG. 8, the coiled electrode battery of this example has the negative plate 22 covered on both sides with the porous film 227, and the positive plate 21 is not covered with a porous film. The negative plate 22 is not only covered with the porous film 227 on both sides, but the non-protruding section 225 is also covered with an insulating layer 228 on which the porous film 227 is heat bonded. The insulating layer 228 is formed by coating the polymer solution so that the porous film 227 is formed thickly also on the non-protruding section 225 of the negative plate 22 when the porous film 227 is formed on both sides of the negative plate 22, and heat bonding the porous film 227 after its formation.

The construction of the rest of the coiled electrode battery of Example 4 is the same as the construction of Example 1 described above.

Action and effect of Example 4

Figure 9:
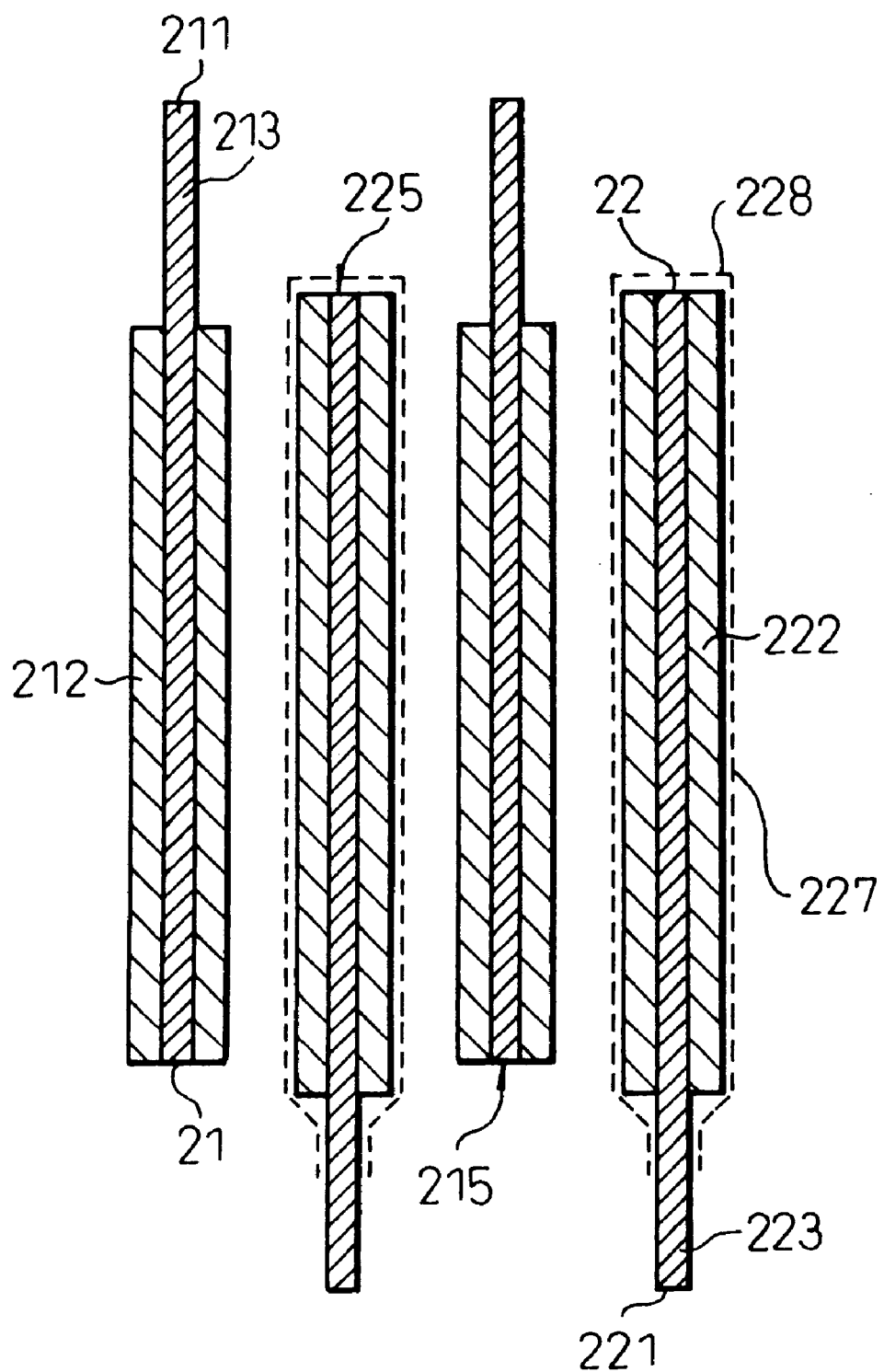
FIG. 9 is a schematic cross-sectional view showing the construction of the coiled electrodes of Example 4.

Since the porous film 227 covers up to the proximal section of the protrusion 223 of the negative plate 22 in the coiled electrode battery of this example as shown in FIG. 9, short-circuiting between the negative plate 22 and the non-protruding section 215 of the exposed electrode of the positive plate 21 is prevented even if the positive plate 21 shifts downward in FIG. 9. Also, since the non-protruding section 225 of the negative plate 22 is covered by the insulating layer 228, short-circuiting between the non-protruding section 225 of the negative plate 22 and the protrusion 213 of the exposed electrode of the positive plate 21 is also prevented.

Here, because the porous film 227 is formed only on the negative plate 22 and is not formed on the positive plate 21, the number of steps required to form the porous film 227 is halved with respect to Example 3 described above. The material for the porous film 227 is also halved with respect to Example 3. The cost required to form the porous film 227 and the insulating layer 228 in this example can therefore be reduced by about half compared to Example 3.

The coiling step for the coiled electrode is also simplified, as in Example 3.

Moreover, since only one layer of the porous film 227 acting as the separator is situated between the positive and negative poles 21, 22, the internal resistance of the battery is reduced, thus allowing even greater output to be achieved.

According to the coiled electrode battery of this example, therefore, an effect is provided whereby not only the yield is improved as in the previously mentioned examples, but the maximum output is also increased and products can be provided more economically.

Modifications to Example 4

In this example the porous film 227 and insulating layer 228 were formed on the negative plate 22, but a modification is possible whereby they are formed on the positive plate 21 instead of on the negative plate 22. This modification provides the same action and effect as Example 4.

EXAMPLE 5

Construction of Example 5

Figure 10:
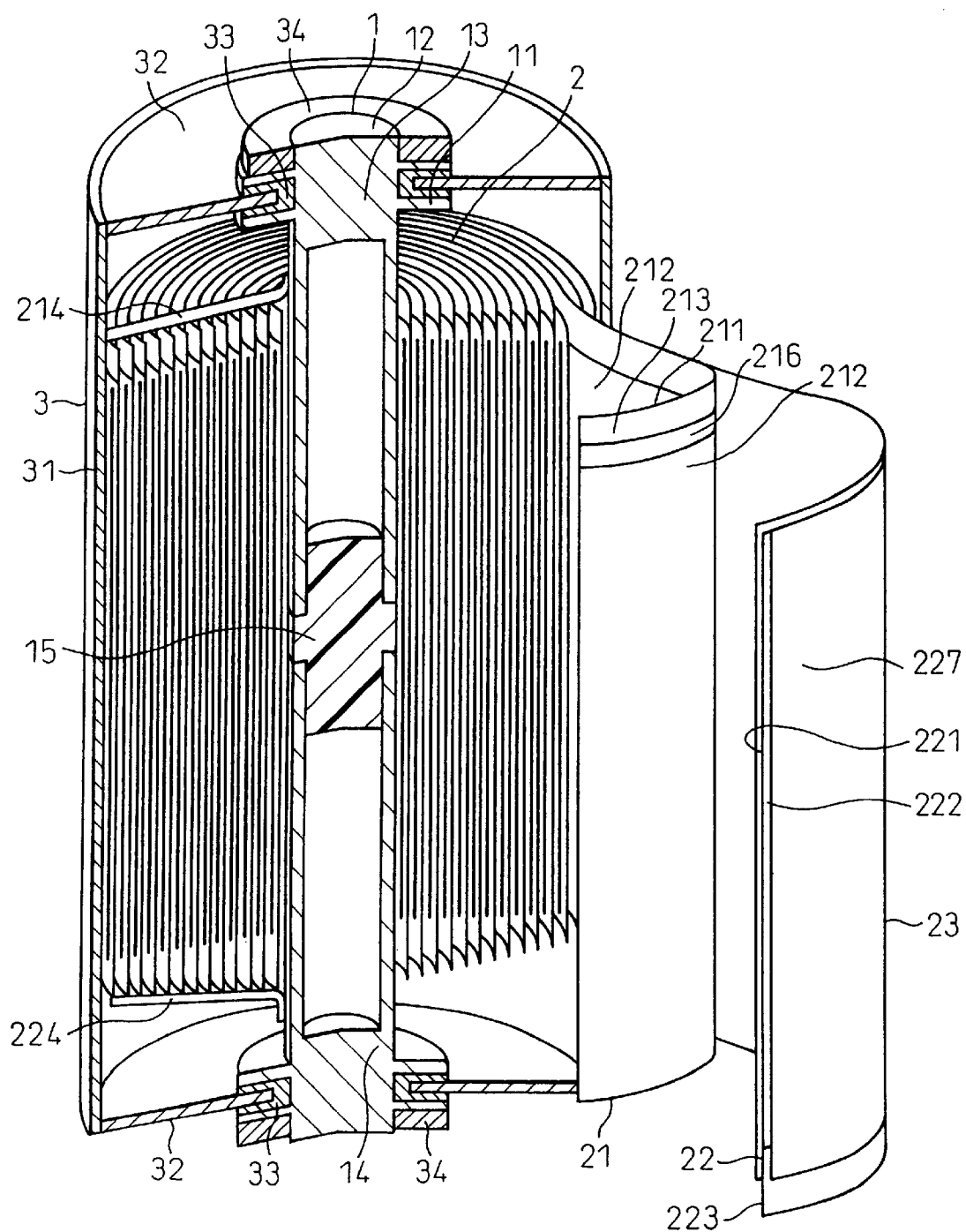
FIG. 10 is a cross-sectional perspective view showing the overall construction of the coiled electrode battery of Example 5.

As shown in FIG. 10, the coiled electrode of this example has a positive plate 21 like the positive plate 21 of Example 1 above, and a negative plate 22 like that of Example 3 above, but has no film-like separator 23.

That is, an insulating layer 216 is formed on both sides at the proximal section of the protrusion 213 of the positive plate 21, as in Example 1. Also, a porous film 227 is formed up to the proximal section of the protrusion 223 on both sides of the negative plate 22, as in Example 3.

The construction of the rest of the coiled electrode battery of Example 5 is the same as the construction of Example 1 described above.

Action and effect of Example 5

Figure 11:
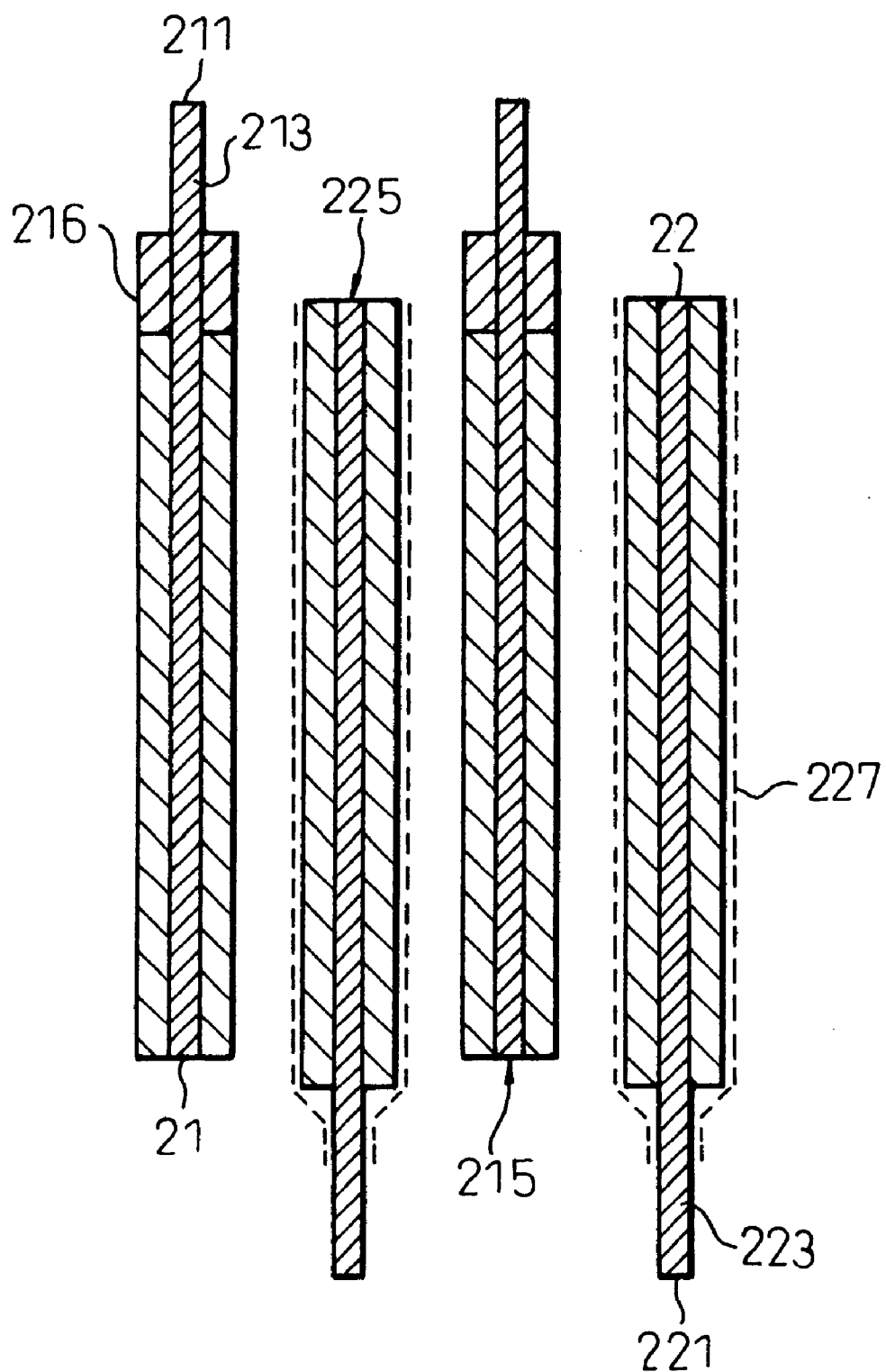
FIG. 11 is a schematic cross-sectional view showing the construction of the coiled electrodes of Example 5.

Short-circuiting between the positive and negative poles 21, 22 is prevented in this example as shown in FIG. 11. That is, since the insulating layer 216 is formed on both sides at the proximal section of the protrusion 213 of the positive plate 21, insulation is provided between the non-protruding section 225 of the negative plate 22 and the protrusion 213 of the positive plate 21, so that short-circuiting cannot occur without a rather large winding misalignment. Also, since the porous film 227 covers up to the proximal section of the protrusion 223 of the negative plate 22, short-circuiting between the non-protruding section 215 of the negative plate 22 and the protrusion 223 of the positive plate 21 is prevented even if the positive plate 21 shifts downward in FIG. 11.

Incidentally, since no film-like separator 23 is used, the coiling step for the coiled electrode is thus simplified.

According to the coiled electrode battery of this example, therefore, an effect is provided whereby short-circuiting is prevented in the battery to result in improved yields, as in the previously mentioned examples.

Modifications to Example 5

Example 5 is an example accomplished by combining Example 1 and Example 3. It is also possible to construct new examples or modifications by appropriately combining any of Examples 1 to 4, in a manner similar to Example 5.

EXAMPLE 6

Construction of Example 6

Figure 12:
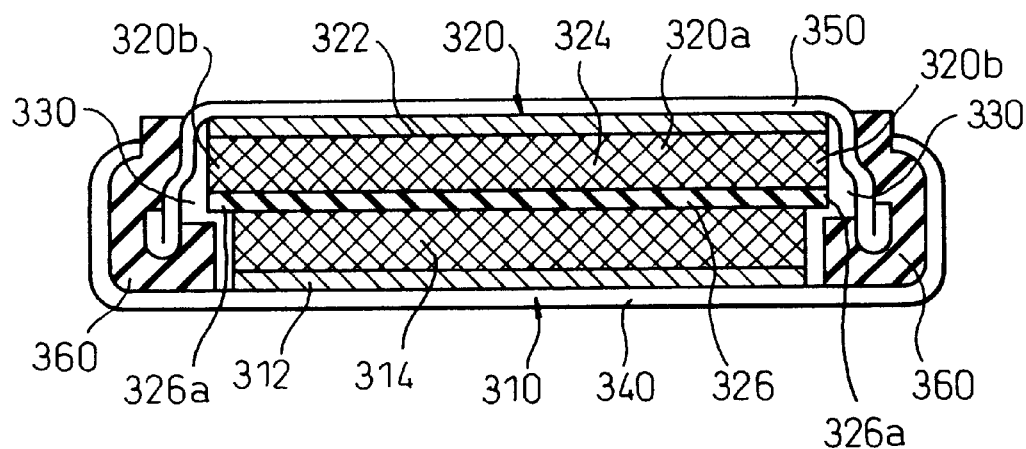
FIG. 12 is a longitudinal cross-sectional view showing the construction of the laminate-type battery of Example 6.

The laminate-type battery of this example, the construction of which is outlined in FIG. 12, is a coin-type lithium ion secondary battery comprising a laminated electrode 300 prepared by laminating a disk-shaped positive plate that can release and occlude lithium ions and a disk-shaped negative plate 320 that can occlude and release lithium ions released from the positive plate 310, and an electrolyte solution 330 lying between the positive plate 310 and negative plate 320.

The positive plate 310, negative plate 320 and electrolyte solution 330 are affixed in the space formed by combining a positive pole case 340 and a negative pole case 350, both made of stainless steel. The space is sealed with a gasket 360 made of polypropylene. That is, the positive pole case 340 and negative pole case 350 act as a pair of positive and negative electrode terminals to supply power externally.

[Construction of positive plate]

The positive plate 310 is an electrode plate having a $LiMn_2O_4$-containing positive pole active material layer 314 integrally formed on a disk-shaped positive pole collector sheet 312 made of aluminum. The positive plate 310 was formed in the following manner.

$LiMn_2O_4$ powder was prepared as the positive pole active material, and carbon powder (KS-15) consisting of artificial graphite was prepared as the conduction material. Polyvinylidene fluoride (PVDF) was prepared as the binder, and NMP was prepared as the dispersion medium. The $LiMn_2O_4$ powder and carbon powder were added to the NMP with the PVDF and mixed thoroughly together to obtain a slurry-like positive pole mixture. Here, the $LiMn_2O_4$ powder, carbon powder and PVDF were combined in a weight ratio of 87:10:3.

Meanwhile, an aluminum foil was prepared with a larger area than the prescribed area of the positive collector sheet 312 necessary for construction of the positive plate 310. The positive pole mixture prepared earlier was coated onto one side of the aluminum foil to form a positive pole mixture layer. After thoroughly drying the positive pole mixture layer in a high-temperature bath together with the positive collector sheet 312, it was pressed to a prescribed density to obtain a positive pole active material layer 314.

Finally, the aluminum foil on which the positive pole active material layer was formed was subjected to a punch press to punch out a prescribed shape (approximately 14-mm diameter disk), producing a positive plate 310 comprising a positive collector sheet 312 and a positive pole active material layer 314.

[Construction of negative plate]

The negative plate 320 is an electrode plate having a carbon-containing negative pole active material layer 324 formed on a negative pole collector sheet 322 made of copper foil, and it has a negative electrode member 320a opposing the positive plate 310 and an integral protrusion 320b protruding out from the edge of the positive plate 310. The protrusion 320b has a short-circuit preventing layer 326a on its surface. In this battery, the surface of the negative plate 320 positioned on the opposite side from the positive plate 310 is bonded to the negative pole case 350, and its protrusion 320b is also bonded to the negative pole case 350.

The negative plate 320 has a porous film 326 integrally formed on its surface in the same body as the short-circuit preventing layer 326a. The porous film 326 is situated between the positive plate 310 and negative plate 320, and functions as a separator to isolate and insulate the positive plate 310 and negative plate 320 while allowing passage of the electrolytes in the electrolyte solution.

The method of producing the negative plate 320 provided with the porous film 326 on its surface will hereinafter be explained in detail.

The electrolyte solution 330 was prepared by dissolving $LiPF_6$ as an electrolyte at a concentration of 1 mole/liter in a solvent obtained by mixing ethylene carbonate and diethyl carbonate in a prescribed ratio.

The positive plate 310 and negative plate 320 were welded to the positive pole case 340 and negative pole case 350, respectively, and the welded pieces were combined. The electrolyte solution 330 was then injected between the positive plate 310 and negative plate 320 and sealed with gaskets 360, 360 to complete the coin-type battery shown in FIG. 12.

(Method for manufacture of negative plate)

The negative plate 320 used for this battery was manufactured in the following manner.

[Electrode forming step]

Mesophase microbead (MCMB) powder was prepared as the negative pole active material. There were also prepared an SBR latex as the binder, a carboxymethyl cellulose sodium salt as a hydrophilic polymer material, and a silane coupling agent as the crosslinking agent. These were combined at a solid ratio of MCMB:SBR latex:carboxymethyl cellulose sodium salt:silane coupling agent=95:3:1:1, and water was used as a dispersing medium (solvent) for thorough mixture to prepare a paste-like negative pole active material-containing mixture (negative pole mixture). A copper foil was also prepared having a larger area than the prescribed area of the negative collector 322 necessary for construction of the negative plate 320.

The negative pole mixture prepared earlier was then coated onto one side of the copper foil with a blade coater to form a negative pole mixture layer.

By drying the negative pole mixture layer in a high-temperature tank with the copper foil, the moisture in the negative pole mixture layer was volatilized and removed to solidify the negative pole mixture layer. The solidified negative pole mixture layer was then press molded to a prescribed density, and then heated in a thermostatic chamber at 110° C. for 1 hour to promote a crosslinking reaction between the carboxymethyl cellulose sodium salt and the silane coupling agent, thus obtaining a negative pole active material layer 324 with excellent organic solvent resistance and water resistance on the copper foil.

Finally, the copper foil on which the negative pole active material layer 324 was formed was subjected to punch pressing to punch out a prescribed shape (15-mm diameter disk) to make a collector section forming a protrusion 320b, thus obtaining a negative plate integrally comprising the negative electrode member 320a and the protrusion 320b.

[Polymer mixture layer-forming step]

First, a polymer mixture was prepared by combining polyphenylene ether (PPO534 by GE Plastics Co.) as a polymer material, lithium bistrifluorosulfonylimide as a lithium imide salt and NMP as their dispersion medium in a weight ratio of 25:5:75. A prescribed amount of a thickener was also added to adjust the viscosity of the polymer mixture. After preparing the polymer mixture, the temperature of the polymer mixture was gradually raised to 100° C. by a prescribed heating method to uniformly dissolve the polyphenylene ether and lithium bistrifluorosulfonylimide salt in the mixture.

A blade coater was used to coat the polymer mixture obtained in this manner to a prescribed thickness on the negative pole active material layer 324 of the negative electrode member and protrusion of the negative plate obtained in the previous electrode-forming step to form a polymer mixture layer. The polymer mixture coated on the negative pole active material layer 324 did not replace the air in the pores of the negative pole active material 324 due to its high viscosity.

[Polymer deposition step]

The negative plate on which the polymer mixture layer was formed was immersed in ethanol, for exchange of the NMP and ethanol simultaneously with extraction of the lithium bistrifluorosulfonylimide in the polymer mixture layer. As a result, the polymer mixture layer gelled and the polyphenylene ether was uniformly deposited in the polymer mixture layer.

[Drying step]

Hot air at 80° C. was blown onto the polyphenylene ether-deposited polymer mixture layer to dry the polymer mixture layer. As a result, the polymer mixture layer became a porous layer, forming a porous film 326 with a short-circuit preventing layer 326a in the same body.

A negative plate 320 was thus obtained having a porous film 326 with a short-circuit preventing layer 326a in the same body integrally formed on its surface.

The porous film 326 formed in this example had finer pores than the porous films 217, 227 formed in Example 3. It is believed that such a porous film was formed because the salt, which was soluble in the poor solvent with respect to the polymer material, when added to the polymer mixture was extracted into the poor solvent and promoted pore formation in the polymer mixture layer.

The porous film 326 had, in the direction of its thickness, a sponge-like interior and a surface having densely formed pores of a smaller size than in the interior. The reason for formation of this porous film is believed to be as follows.

In the polymer mixture layer-forming step, a polymer mixture layer with the polymer material finely dispersed therein is formed on the surface of the negative plate. In the subsequent polymer deposition step, the good solvent and poorly dissolving solvent are exchanged in the polymer mixture layer, but because of the rapid exchange between the good solvent and the poor solvent on the surface of the polymer mixture layer, the polymer material undergoes polymer aggregation, and the polymer material is thus finely deposited on the inside. Meanwhile, since the exchange between the good solvent and the poor solvent occurs more rapidly and uniformly, though later, in the interior compared to the surface, the polymer material is deposited in a fibril-like and relatively thin fashion, with the uniform deposition including gaps (which later become pores) of a common size. Thus, a polymer mixture layer is obtained wherein the polymer material is deposited in different forms in the interior and on the surface.

Furthermore, in the subsequent drying step the solvent in the polymer mixture layer volatilizes, creating a porous quality. In the interior, the solvent in the gaps between the fibrils is removed, uniformly forming pores of the same size, to produce a sponge-like structure. On the surface, meanwhile, the solvent in the gaps between the finely deposited polymer aggregates is removed, producing a structure with densely formed pores of a smaller size than those in the interior.

It is believed that a porous film is thus formed with a sponge-like interior and a surface with densely formed pores of a smaller size than those in the interior, in the direction of thickness.

Action and effect of Example 6

As shown in FIG. 12, a porous film 326 is formed on the protrusion of the negative plate 320. Consequently, the short-circuit preventing film 326a (porous film 326) lying between the protrusion 320b of the negative plate 320 and the edge (non-protruding section) of the positive plate 310 prevents short-circuits. In the laminate-type battery of this example, therefore, short-circuiting between the positive plate 310 and the negative plate 320 inside the battery is effectively prevented.

Furthermore, even when burrs are produced in the non-protruding section of the positive plate 310 by punching, the short-circuit preventing layer 326a on the protrusion 320b of the negative plate 320 prevents short-circuiting between the positive and negative poles in the same manner.

According to the laminate-type battery of this example, therefore, short-circuiting between the positive and negative poles inside the battery is reliably prevented, so that an effect is provided whereby a laminate-type battery with higher product yields is provided.

Moreover, since there is no film separator between the positive plate 310 and negative plate 310 and only the positive plate 310 and the negative plate 320 with the porous film 326 are laminated in the battery assembly step (electrode lamination step), the battery assembly step is thus simplified. The risk of lamination misalignment of the separator is also eliminated.

According to the laminate-type battery of this example, therefore, not only is short-circuiting inside the battery prevented, but the battery assembly step is also simplified so that lamination misalignments can be prevented, for an effect of further improved yields.

(Evaluation method)

Figure 13:
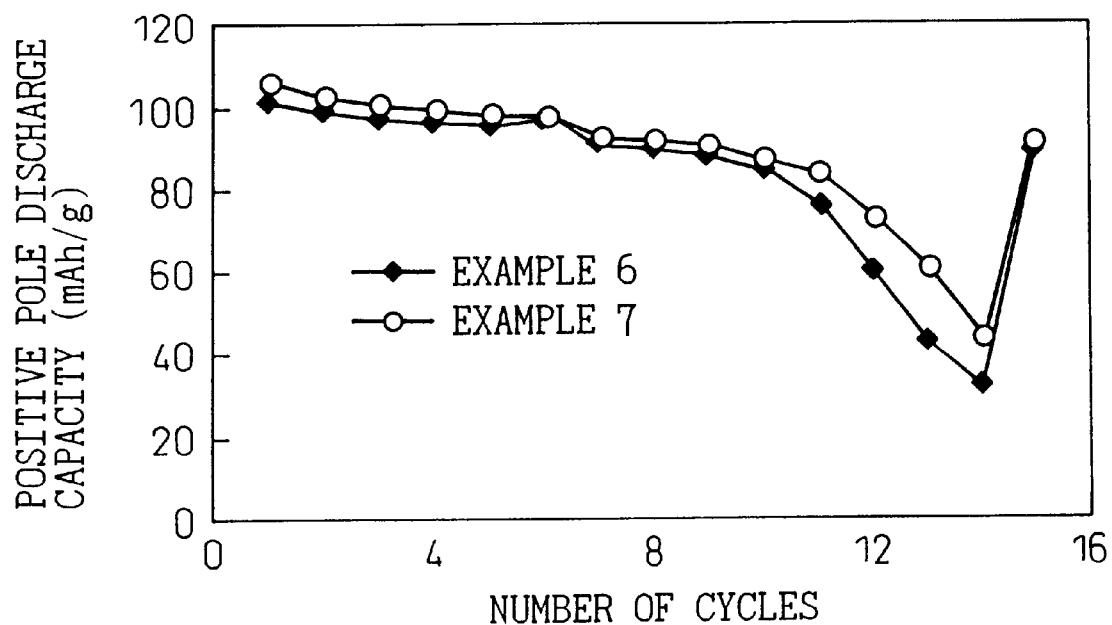
FIG. 13 is a graph showing the charge/discharge cycle characteristics of the laminate-type batteries of Example 6 and Example 7.

A laminate-type battery fabricated in the manner described above was subjected to repeated charge/discharge under the charge/discharge conditions shown in Table 1, and the discharge capacity per cycle was measured. The measurement results are shown in FIG. 13. FIG. 13 shows the measured discharge capacity in terms of capacity per gram of positive electrode active material.

TABLE 1

| Number of cycles | Charge 4.2(V)CC-CV current density (mA/cm$^2$) | Discharge 3.0(V)CC current density (mA/cm$^2$) |
| --- | --- | --- |
| 1 | 1.0 | 1.0 |
| 2 | 1.0 | 1.0 |
| 3 | 1.0 | 1.0 |
| 4 | 1.0 | 1.0 |
| 5 | 1.0 | 1.0 |
| 6 | 1.0 | 0.2 |
| 7 | 1.0 | 0.5 |
| 6 | 1.0 | 1.0 |
| 9 | 1.0 | 2.0 |
| 10 | 1.0 | 4.0 |
| 11 | 1.0 | 6.0 |
| 12 | 1.0 | 8.0 |
| 13 | 1.0 | 10.0 |
| 14 | 1.0 | 12.0 |
| 15 | 1.0 | 0.5 |

From FIG. 13 it is seen that the initial capacity per gram of positive electrode active materials was a high value of 101 mAh/g). These results demonstrate that the laminate-type battery of this example has a high capacity.

These results that were obtained were attributed to the use of the negative plate 320 having the integrally formed porous film 326 with uniform fine pores and provided with a sponge-like center and a surface with densely formed pores of a smaller size than the center, in the direction of thickness. This is believed to be the reason for the smoother permeation of electrolytes in the porous film 326 and the improved load characteristics and output characteristics of the battery.

EXAMPLE 7

In this example, the negative electrode was fabricated with a porous film integrally formed on the surface in the same manner as Example 6, except that water was used as the poor solvent in the polymer deposition step.

The porous film formed in this example had a uniform distribution of pores of a uniform pore size, and had a substantially larger aperture of the pores. It is believed that this sort of porous film was formed because of the lower speed of exchange between the good solvent NMP and the poor solvent, forming pores with a uniform pore size at a uniform distribution and substantially increasing the size of the aperture of the pores, due to the use of water as the poor solvent in the polymer deposition step.

This negative pole was then used to fabricate a coin-type laminate-type battery as a lithium ion secondary battery, in the same manner as Example 6. The laminate-type battery was subjected to repeated charge/discharge under the charge/discharge conditions shown in Table 1, and the discharge capacity per cycle was measured. The measurement results are shown in FIG. 13. FIG. 13 shows the measured discharge capacity in terms of capacity per gram of positive electrode active material for this example, similar to Example 6.

As shown in FIG. 13, the initial capacity per gram of positive electrode active materials was a high value of 106 (mAh/g). These results demonstrate that the laminate-type battery of this example has even a higher capacity than the laminate-type battery of Example 6.

These results that were obtained were attributed to smoother permeation of electrolytes through the porous film, compared to the porous film formed in Example 6, due the use of the negative plate having the porous film formed with pores of a uniform size at a uniform distribution and with a substantially larger aperture of the pores. It is believed that the battery characteristics of the laminate-type battery during large current discharge were improved as a result.

EXAMPLE 8

A laminate-type battery was fabricated in the same manner as Example 6, except that a negative pole formed in the following manner was used.

First, MCMB powder was prepared as the negative pole active material. There were also prepared an SBR latex as the binder and carboxymethyl cellulose as a hydrophilic polymer material. These were combined at a solid ratio of MCMB:SBR latex:carboxymethyl cellulose=95:4.7:0.3, and water was used as a dispersing medium (solvent) for thorough mixture to prepare a paste-like negative pole active material-containing mixture (negative pole mixture). A copper foil was also prepared having a larger area than the prescribed area of the negative collector necessary for construction of the negative plate.

The negative pole mixture prepared earlier was then coated onto one side of the copper foil with a blade coater to form a negative pole mixture layer.

By drying the negative pole mixture layer in a high-temperature tank with the negative collector sheet, the moisture in the negative pole mixture layer was volatilized and removed to solidify the negative pole mixture layer. The solidified negative pole mixture layer was then press molded to a prescribed density to obtain a negative pole active material layer on the copper foil.

Finally, the copper foil on which the negative pole active material layer was formed was subjected to punch pressing to punch out a prescribed shape (15-mm diameter disk) to make a collector section forming a protrusion, thus obtaining a negative plate integrally comprising the negative electrode member and the protrusion.

A porous film was then formed on the surface of this negative plate in the following manner.

First, a paste-like polymer mixture was prepared by dissolving polyphenylene ether (PPO534 by GE Plastics Co.) with a solid concentration of 25 wt % and lithium bistrifluorosulfonylimide in NMP. For this example, the polymer mixture was adjusted to a polyphenylene ether content of 100 parts by weight and a lithium bistrifluorosulfonylimide content of 20 parts by weight.

The polymer mixture obtained in this manner was coated evenly on the surface of the earlier obtained negative plate to an approximately uniform thickness using a blade coater, to form a polymer mixture layer. The polymer mixture layer was immersed with the negative plate in water for 2 minutes and then drawn out and dried. This resulted in formation of a porous film on the negative plate having a short-circuit preventing layer in the same body.

Figure 14:
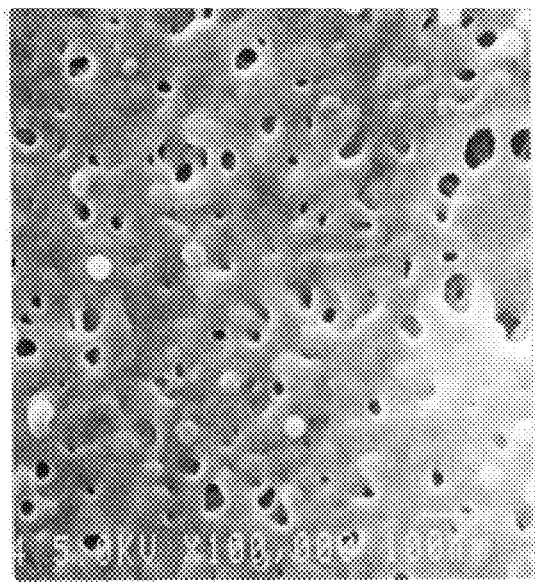
FIG. 14 is an SEM photograph showing the condition of the surface of the porous film formed on the negative pole in the laminate-type battery of Example 8, at 100,000× magnification.

Observation of the porous film using a scanning electron microscope revealed densely formed pores with a maximum size of 80 nm, as shown in the SEM photograph of FIG. 14.

Figure 15:
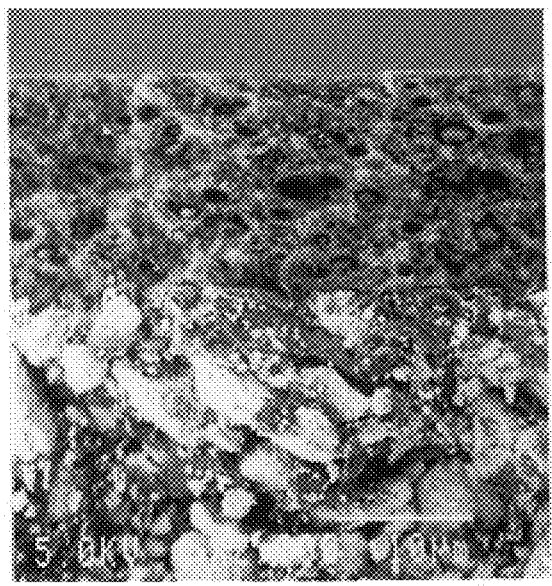
FIG. 15 is an SEM photograph showing a cross-section of the porous film formed on the negative pole in the laminate-type battery of Example 8, at 2000× magnification.

Observation of a cross-section of the porous film by SEM revealed integral formation of a porous film on the electrode plate, as shown in the SEM photograph of FIG. 15.

Figure 16:
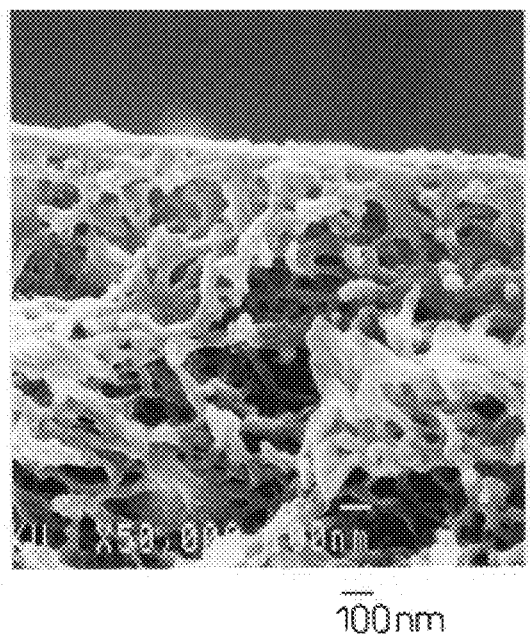
FIG. 16 is an SEM photograph showing a cross-section in the direction of thickness near the surface of the porous film formed on the negative pole in the laminate-type battery of Example 8, at 50,000× magnification.

More detailed observation of a cross-section near the surface of the porous film in the thickness direction revealed densely formed small pores within 1 μm of the surface, as well as relatively thin fibrils and a relatively uniform long axis and short axis, as shown in the SEM photograph of FIG. 16.

Figure 17:
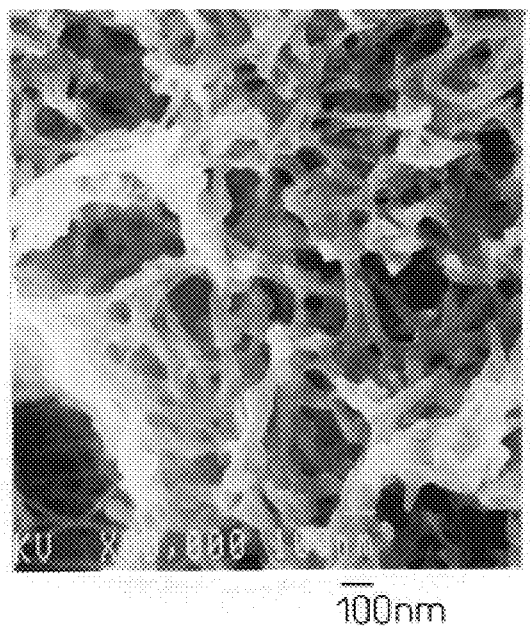
FIG. 17 is an SEM photograph showing a cross-section in the direction of thickness of the interior of the porous film formed on the negative pole in the laminate-type battery of Example 8, at 50,000× magnification.

More detailed observation of a cross-section of the interior of the porous film in the thickness direction revealed the presence of pores as sponge-like pores, as shown in the SEM photograph of FIG. 17.

Thus, SEM observation of the porous film formed in this example revealed that it had a sponge-like interior and a surface with densely formed pores of a smaller pore size than the interior, in the direction of its thickness.

EXAMPLE 9

A negative pole was produced in the same manner as Example 8, except that the porous film was formed on the surface of the negative plate using the following polymer mixture.

A polymer mixture was prepared with a polyphenylene content of 100 parts by weight and a lithium bistrifluorosulfonylimide content of 10 parts by weight.

The negative pole produced in this manner was used to fabricate a laminate-type battery in the same fashion as Example 6.

EXAMPLE 10

A negative pole was produced in the same manner as Example 8, except that the porous film was formed on the surface of the negative plate using the following polymer mixture.

A polymer mixture was prepared with a polyphenylene content of 100 parts by weight and a lithium bistrifluorosulfonylimide content of 5 parts by weight.

The negative pole produced in this manner was used to fabricate a laminate-type battery in the same fashion as Example 6.

EXAMPLE 11

A negative pole was produced in the same manner as Example 8, except that the porous film was formed on the surface of the negative plate using the following polymer mixture.

A paste-like polymer mixture was prepared by dissolving polyphenylene ether (PPO534 by GE Plastics Co.) with a solid concentration of 25 wt % in NMP. For this example, the polymer mixture was prepared without adding lithium bistrifluorosulfonylimide. The polymer mixture was used to form a porous film on the surface of the negative plate in the same manner as Example 8.

The negative pole produced in this manner was used to fabricate a laminate-type battery in the same fashion as Example 6.

Evaluation of laminate-type batteries of Examples 8–11

The laminate-type batteries of Examples 8–11 fabricated as described above were measured for discharge capacity under the following charge/discharge conditions.

Figure 18:
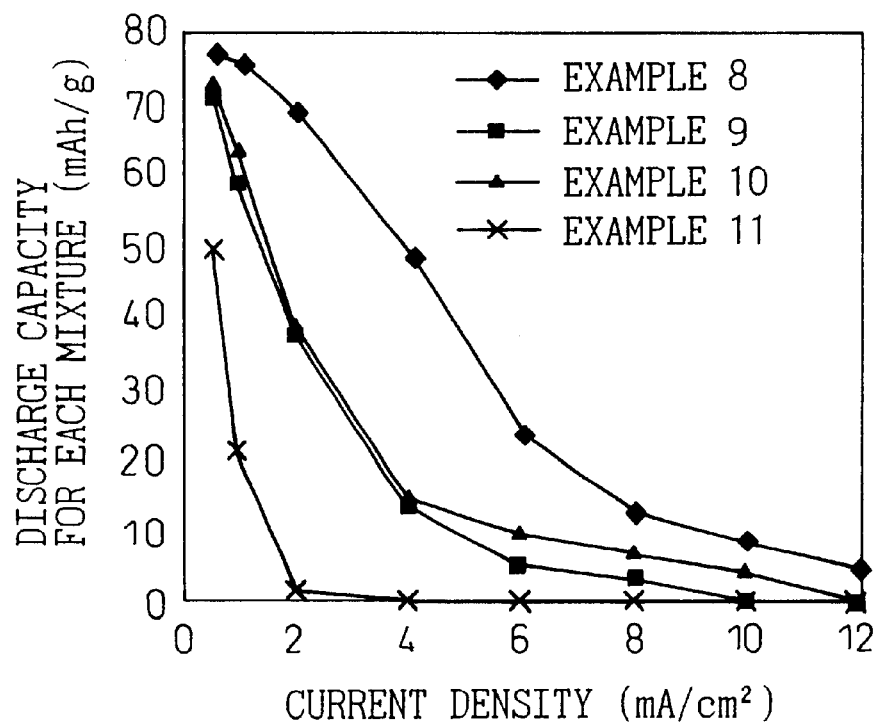
FIG. 18 is a graph showing the charge/discharge characteristics of the laminate-type batteries of Examples 8 to 11.

After charging for a total of 4 hours at a constant current of 1 mA/cm$^2$ and a constant voltage of 4.2 V, discharge was performed at a constant current of 0.5–12 mA/cm$^2$. The results of measurement of the discharge capacity for each laminate-type battery are shown in Table 2 and FIG. 18. In FIG. 18, the measured discharge capacities are shown in terms of capacity per gram of positive electrode active material.

TABLE 2

| Current density (mA/cm$^2$) | Example 8 | Example 9 | Example 10 | Example 11 |
|---|---|---|---|---|
| 0.50 | 77.5 | 71.4 | 72.9 | 50.1 |
| 1.00 | 75.7 | 59.5 | 63.8 | 21.3 |
| 2.00 | 69.6 | 37.9 | 38.3 | 1.6 |
| 4.00 | 4B.7 | 13.1 | 14.9 | 0.0 |
| 6.01 | 24.3 | 4.9 | 10.0 | 0.0 |
| 8.01 | 13.0 | 3.3 | 6.6 | 0.0 |
| 10.01 | 8.1 | 0.0 | 4.1 | 0.0 |
| 12.01 | 4.9 | 0.0 | 0.0 | 0.0 |

From Table 2 and FIG. 18 it is seen that the laminate-type batteries of Examples 8 to 10 all had superior discharge load characteristics compared to the laminate-type battery of Example 11. These results demonstrate that a layer with a dense surface can be rendered porous by using lithium bistrifluoromethylsulfonylimide as the lithium salt.

Table 2 and FIG. 8 also show that the laminate-type batteries of Examples 8 to 10 give a larger discharge capacity than the laminate-type battery of Example 11, whether with low current or high current. Of the laminate-type batteries of Examples 8 to 10, the laminate-type battery of Example 8 had the lowest capacity reduction even at high current. These results demonstrate that by including the polymer material at content of 100 parts by weight and the lithium salt at a content of 5–20 parts by weight when preparing the polymer mixture, a sufficiently high discharge capacity can be easily achieved whether at low current or at high current.

EXAMPLE 12

Figure 19:
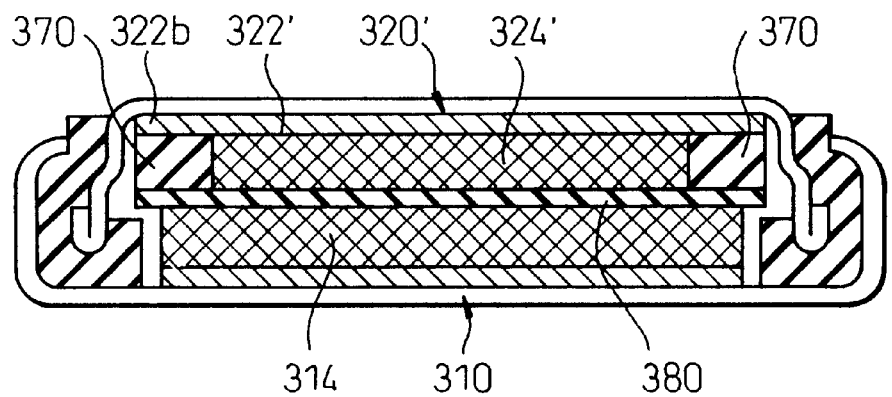
FIG. 19 is a longitudinal cross-sectional sketch showing the construction of the laminate-type battery of Example 12.

The construction of the laminate-type battery of this example is generally shown in FIG. 19, and it is a laminate-type battery with the same construction as Example 6, except for the construction of the negative plate 320' and the use of a separator 380 formed separately from the negative plate 320' instead of the porous film 326. In this laminate-type battery, the negative plate 320' is constructed of a negative pole collector 322' having a larger size than the positive pole active material layer 314, and a negative pole active material layer 324' having a smaller size than the positive polymer active material layer 314. Thus, the edge 322b of the negative pole collector 322' forms a protrusion protruding out from the edge of the positive plate 310. The separator 380 lies between the positive pole active material layer 314 and the negative pole active material layer 324', and the separator 380 is formed from polypropylene.

In this example, a short-circuit preventing layer 370 with the same layer thickness as the negative pole active material layer 324' is formed on the surface of the proximal section of the edge 322b of the negative pole collector 322'. This short-circuit preventing layer 370 can be formed by using a water-dispersing fluorine-based resin as a hydrophilic polymer material and a thickener composed of a water-soluble polymer to prepare a paste and then coating, drying and baking it, etc.

In the laminate-type battery of this example, even if the separator 380 experiences lamination misalignment, short-circuiting between the positive and negative poles is prevented by the presence of the short-circuit preventing layer 370 lying between the edge 322b of the negative pole collector 322' (protrusion of the negative plate) and the edge of the positive pole active material layer 324' (edge of the positive plate).

Also, even if burrs are produced by punching, short-circuiting between the positive and negative poles is likewise prevented because of the short-circuit preventing layer 370 situated on the edge 322b of the negative pole collector 322'.

According to the laminate-type battery of this example, therefore, short-circuiting between the positive and negative poles in the battery can be reliably prevented, and therefore an effect is provided whereby laminate-type batteries can be manufactured with higher product yields.

EXAMPLE 13

Figure 20:
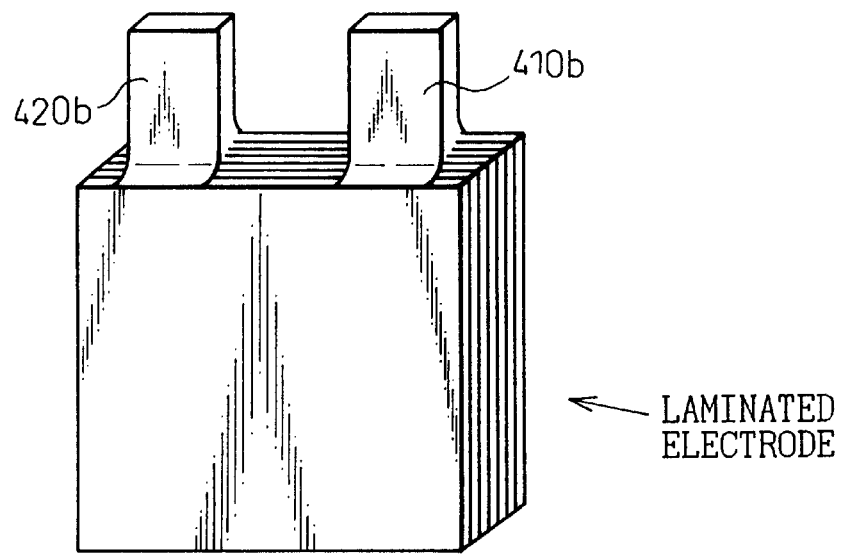
FIG. 20 is a perspective view showing the laminated electrodes of the laminate-type battery of Example 13.
Figure 26:
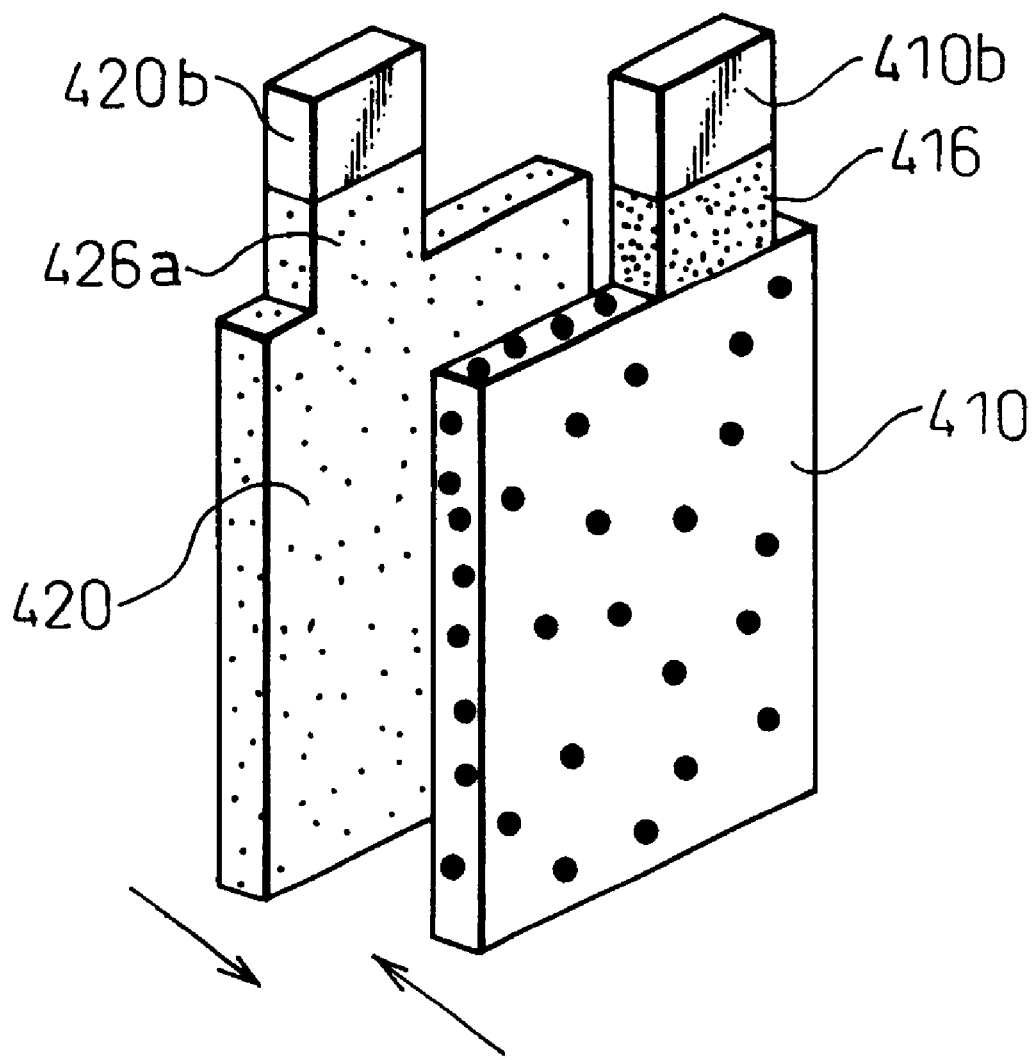
FIG. 26 is a perspective view showing the positive plate and negative plate as they are laminated (the electrode plates as they are laid together) in the laminate-type battery of Example 13.

The laminate-type battery of this example is a square lithium secondary battery provided with nearly rectangular laminated electrodes, as shown in FIG. 20. As shown in FIG. 26, this laminate-type battery has nearly rectangular positive plates 410 and negative plates 420 alternately laminated.

{Construction of positive plate}

Figure 21A:
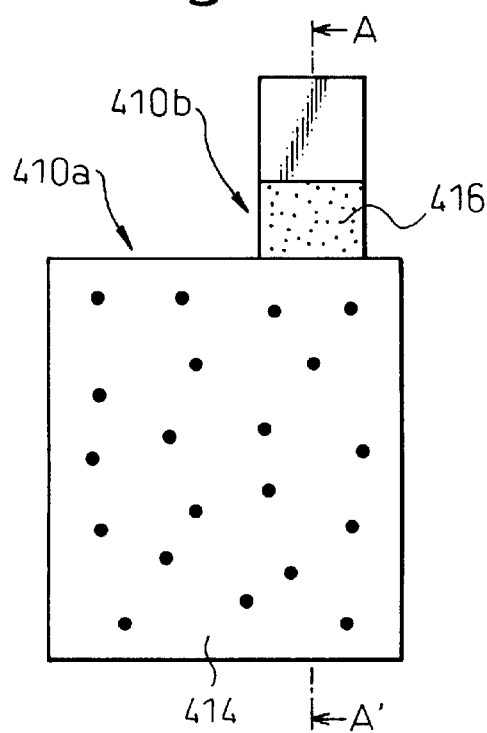
FIG. 21A is a front view of the positive plate and FIG. 21B is a cross-sectional view along A–A' in FIG. 21A.
Figure 21B:
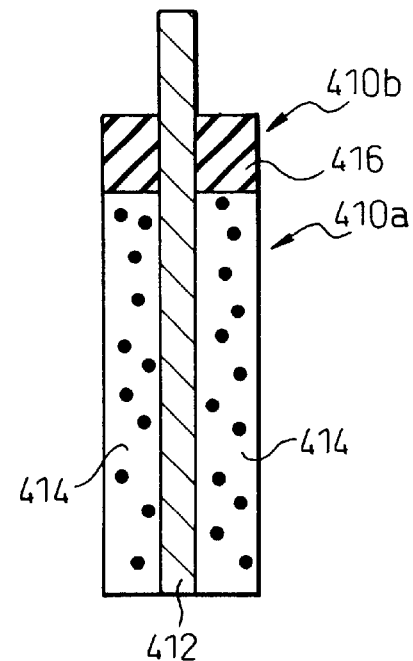

As shown in FIGS. 21A and 21B, the positive plate 410 is constructed of a flat rectangular positive electrode 410a and a strip-shaped protrusion 410b.

The positive electrode 410a has an LiMn$_2$O$_4$-containing positive electrode active material layer 414 integrally formed on a flat square positive pole collector 412 made of aluminum foil.

The protrusion 410b is made of metal foil and is integrally formed with the positive pole collector 412 of the positive electrode 410a, and connects with a positive terminal (not shown). The protrusion 410b may also be formed in the same body as the positive pole collector 412. On the surface of the proximal section of the protrusion 410b there is formed a short-circuit preventing layer 416 made of an insulator.

{Method of forming positive plate}

The positive plate 410 may be formed, for example, in the following manner.

LiMn$_2$O$_4$ powder is prepared as the positive pole active material, and carbon powder (KS-15) consisting of artificial graphite is prepared as the conduction material. Polyvinylidene fluoride (PVDF) is prepared as the binder, and NMP is prepared as the dispersion medium. The LiMn$_2$O$_4$ powder and carbon powder are added to the NMP with the PVDF in a prescribed mixing ratio and mixed thoroughly together to obtain a slurry-like positive pole mixture.

Figure 22:
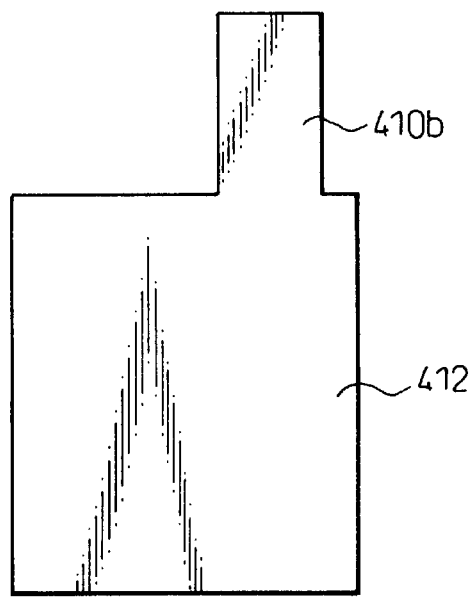
FIG. 22 is a front view of the positive collector sheet of the positive plate in the laminate-type battery of Example 13.
Figure 23A:
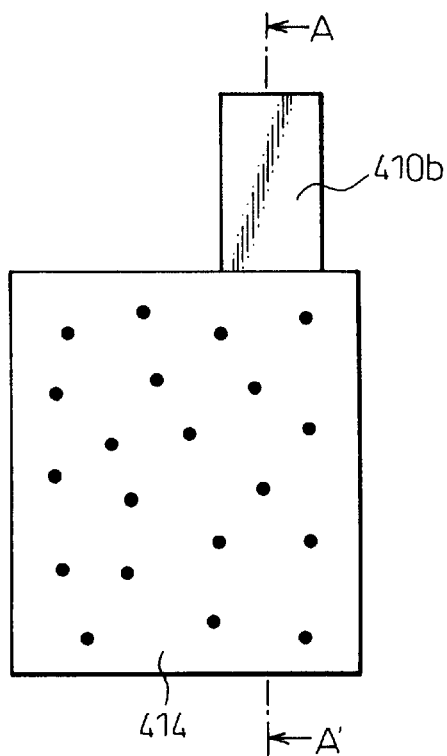
FIG. 23A is a front view and FIG. 23B is a cross-sectional view along A–A' in FIG. 23A.
Figure 23B:
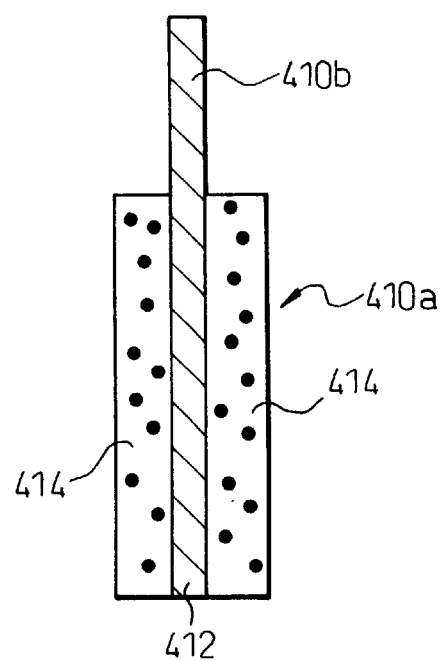

Meanwhile, as shown in FIG. 22, a positive pole collector sheet is prepared having a positive collector 412 composing the positive electrode and a protrusion 410b formed in the same body. The positive collector sheet may be formed by punching from a sheet-like aluminum foil by a press punching method. On both sides of the positive collector 412 of the positive collector sheet there is formed a positive pole mixture layer by coating the positive pole mixture prepared earlier. After thoroughly drying the positive pole mixture layer in a high-temperature chamber, it is pressed to a prescribed density to obtain the positive pole active material layer 414 shown in FIGS. 23 (23A, 23B).

On the proximal section of the protrusion 410b of the collector sheet on which the positive pole active material layer 414 is formed, there is formed a short-circuit preventing layer using a water-dispersing fluorine-based resin as a hydrophilic polymer material and a thickener composed of a water-soluble polymer to prepare a paste and then coating, drying and baking it, etc. The positive plate shown in FIG. 21 may be obtained in this manner.

{Construction of negative plate}

Figure 24A:
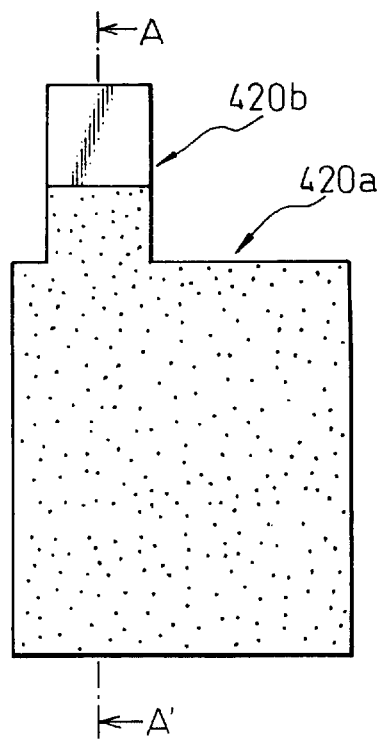
FIG. 24A is a front view of the negative plate.
Figure 24B:
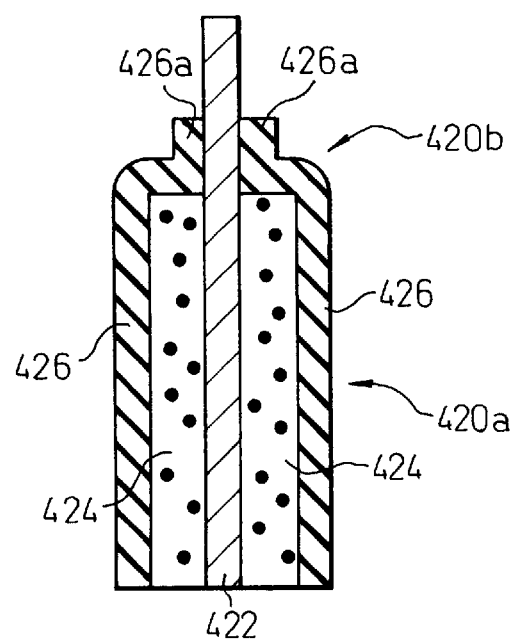
FIG. 24B is a cross-sectional view along A–A' in FIG. 24A.

As shown in FIGS. 24 (24A, 24B), the negative plate 420 is constructed of a flat rectangular negative electrode 420a and a strip-shaped protrusion 420b.

The positive electrode 420a has a carbon-containing negative electrode active material layer 424 integrally formed on a flat square negative pole collector 422 made of copper.

The protrusion 420b is made of metal foil and is integrally formed with the negative pole collector 422 of the negative electrode 420a, and connects with a negative terminal (not shown). The protrusion 420b may also be formed in the same body as the positive pole collector 422. On the surface of the negative pole active material layer 424 and the proximal section of the protrusion 420b there is formed a porous film. The section of the porous film formed on the surface of the proximal section of the protrusion 420b corresponds to the short-circuit preventing layer 426a.

{Method of forming negative plate}

The negative plate 420 may be formed, for example, in the following manner.

First, MCMB powder is prepared as the negative pole active material. There are also prepared an SBR latex as the binder and carboxymethyl cellulose as a hydrophilic polymer material. These are combined at a solid ratio of MCMB::SBR latex:carboxymethyl cellulose=95:4.7:0.3, and water is used as a dispersing medium (solvent) for thorough mixture to prepare a paste-like negative pole active material-containing mixture (negative pole mixture). A negative pole collector sheet is also prepared having a negative collector 422 composing the negative electrode and a protrusion 420b formed in the same body. The negative collector sheet may be formed by punching from a sheet-like copper foil by a press punching method.

Figure 25A:
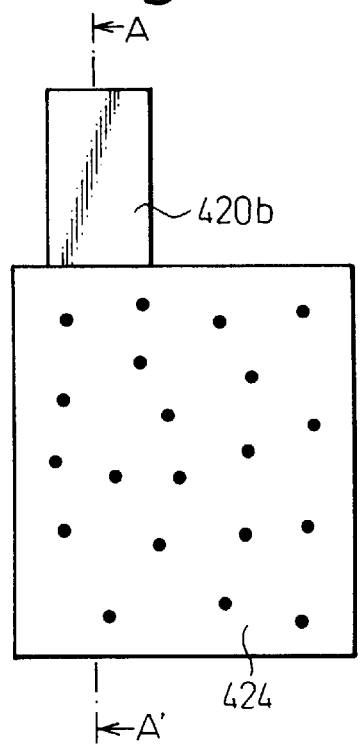
FIG. 25A is a front view and FIG. 25B is a cross-sectional view along A–A' in FIG. 25A.
Figure 25B:
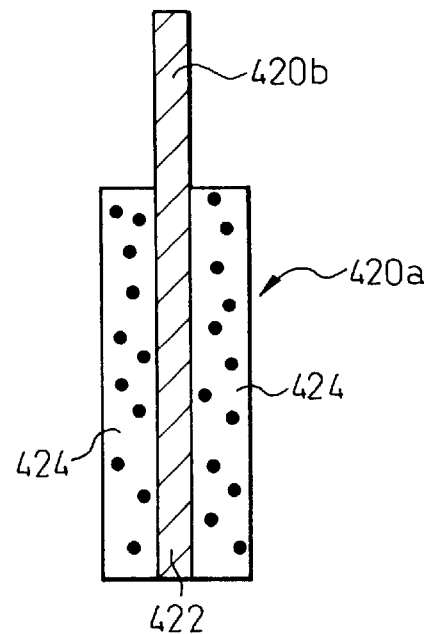

On both sides of the negative collector sheet there is formed a negative pole mixture layer by coating the negative pole mixture prepared earlier using a blade coater. By drying the negative pole mixture layer in a high-temperature chamber, the moisture in the negative pole mixture layer is volatilized and removed to solidify the negative pole mixture layer. The solidified negative pole mixture layer is then press molded to a prescribed density to obtain a negative pole active material layer 424 on a negative collector 422 as shown in FIGS. 25 (25A, 25B).

A negative plate integrally comprising a negative electrode 420a and a protrusion 420b is thus obtained. A porous film 426 is then formed on the surface of this negative plate in the following manner.

First, a polymer mixture is prepared by dissolving polyphenylene ether (PPO534 by GE Plastics Co.) with a solid concentration of 25 wt % and lithium bistrifluorosulfonylimide in NMP. For this example, the polymer mixture is prepared having a lithium bistrifluorosulfonylimide content of 5 wt % with respect to 100 wt % as the total mixture.

The polymer mixture obtained in this manner is coated evenly on the surface of the earlier obtained negative plate to an approximately uniform thickness using a blade coater, to form a polymer mixture layer.

The polymer mixture layer is immersed in water for 2 minutes and then drawn out and dried. This results in formation of a porous film 426 on the negative plate having a short-circuit preventing layer 426a in the same body.

{Fabrication of battery}

The positive plate 410 and negative plate 420 obtained in the manner described above are alternately laminated so that the protrusions 410b, 420b do not lie on one another, as shown in FIG. 26, to form the laminated electrode shown in FIG. 20.

This electrode laminate is fitted in a prescribed chamber, and an electrolyte solution prepared in the same manner as Example 6 is poured into the chamber. A cover on which an electrode terminal has been formed is mounted on the chamber with the electrode terminal connected to the laminated electrode. A square lithium secondary battery can thus be obtained.

What is claimed is:

1. A laminate-type battery, comprising:
   a laminated electrode prepared by laminating a positive plate formed by providing a positive pole active material layer on a surface of a positive pole sheet collector having one edge and another edge,
   a negative plate formed by providing a negative pole active material layer on a surface of a negative pole sheet collector having one edge and another edge,
   said one edge of the negative pole sheet collector being located on a side of said one edge of the positive pole sheet collector, and
   a separator having one edge and another edge and lying between said positive plate and said negative plate,
   said one edge of the separator being located on said side of said one edge of the positive pole sheet collector,
   wherein the one edge of the collector of at least one of said positive plate and said negative plate, as a first electrode plate, has a protrusion that protrudes out beyond the one edge of the collector of the other electrode plate, as a second electrode plate, of opposite polarity, and
   wherein a short-circuit preventing layer for preventing an electrical short-circuit between the first electrode plate and the second electrode plate is provided on or over the protrusion of the first electrode plate.

2. A laminate-type battery according to claim 1, which has a coiled electrode construction wherein said positive plate, said negative plate and said separator are coiled while laminated together, and said protrusion protrudes out in the coiled axial length direction.

3. A laminate-type battery according to claim 1, wherein said short-circuit preventing layer is made of an insulator.

4. A laminate-type battery according to claim 1, wherein said short-circuit preventing layer includes which extends from said one edge of the separator to said protrusion.

5. A laminate-type battery according to claim 4, wherein said another edge of the collector of the second electrode plate adjacent to the first electrode plate has a protrusion that protrudes out beyond a non-protruding other edge of the first electrode plate, said separator has a shape which covers both sides of the first electrode plate and said non-protruding edge of the first electrode plate, and a section of said separator which covers said non-protruding edge isolates said non-protruding edge from said protrusion of the second electrode plate adjacent to said non-protruding edge.

6. A laminate-type battery according to claim 1, wherein said separator is a porous film formed integrally on the surface of either of or both of said protrusion-provided electrode plate of said positive plate and said negative plate.

7. A laminate-type battery according to claim 6, wherein said porous film contains at least one type from among polypropylene, polybenzimidazole, polyimide, polyether imide, polyamidoimide, polyphenylene ether, polyallylate, polyacetal, polyamide, polyphenylene sulfide, polyethersulfone, polysulfone, polyether ketone, polyester resins, polyethylene naphthalate, ethylene-cycloolefin copolymers, polyvinylidene fluoride and vinylidene fluoride-hexafluoropropylene-tetrafluoroethylene copolymer.

8. A laminate-type battery according to claim 7, wherein said polyester resin is either or both polybutylene terephthalate and polyethylene terephthalate.

9. A laminate-type battery according to claim 6, wherein said porous film is provided with, in the direction of its thickness, a sponge-like interior and a surface having densely formed pores of a smaller size than in said interior.

10. A laminate-type battery according to claim 1, wherein either or both of said positive plate and said negative plate consist of at least an active material and a binder, and said binder comprises a hydrophilic polymer material with hydrophilic groups which is crosslinked together via a crosslinking agent which undergoes a binding reaction with said hydrophilic groups.

11. A laminate-type battery according to claim 1, wherein the active material layer is provided in an area on the surface of the collector of the first electrode plate, the collector also including a border area of the one edge wherein there is no active material and the short-circuit-preventing layer is provided on the border area.

12. A laminate-type battery according to claim 11, wherein the short-circuit-preventing layer is provided in a section of the border area proximate the active material-provided area of the collector.

13. A laminate-type battery according to claim 1, wherein the one edge of the collector of the positive plate protrudes out beyond the one edge of the collector of the negative plate, said another edge of the collector of the negative plate protrudes out beyond the other edge of the collector of the positive plate, and the short-circuit preventing layer is provided on or over both of the protrusions of the positive and negative plates.

14. A laminate-type battery, comprising:

a laminated electrode prepared by laminating a positive plate formed by providing a positive pole active material layer on a surface of a disk-shaped positive pole sheet collector, a negative plate formed by providing a negative pole active material layer on a surface of a disk-shaped negative pole sheet collector, and a disk-shaped separator lying between said positive plate and said negative plate, wherein an edge of the collector of at least one of said positive plate and said negative plate, as a first electrode plate, has a protrusion that protrudes out beyond an edge of the collector of the other electrode plate, as a second electrode plate, of opposite polarity, and wherein a short-circuit preventing layer for preventing an electrical short-circuit between the first electrode plate and the second electrode plate is provided on or over the protrusion of the first electrode plate.

* * * * *